United States Patent [19]

Harrow et al.

[11] Patent Number: 5,682,489
[45] Date of Patent: *Oct. 28, 1997

[54] METHOD AND DEVICE FOR MONITORING, MANIPULATING, AND VIEWING SYSTEM INFORMATION

[75] Inventors: Jeffrey R. Harrow, Amherst, N.H.; Fred P. Messinger, Groton, Mass.

[73] Assignee: Digital Equipment Corporation, Inc., Maynard, Mass.

[*] Notice: The term of this patent shall not extend beyond the expiration date of Pat. No. 5,375,199.

[21] Appl. No.: 359,675

[22] Filed: Dec. 20, 1994

Related U.S. Application Data

[63] Continuation of Ser. No. 710,135, Jun. 4, 1991, Pat. No. 5,375,199.

[51] Int. Cl.$^6$ ........................................ G06F 3/00
[52] U.S. Cl. ............... 395/349; 395/200.11; 395/341
[58] Field of Search ........................ 395/155–161, 395/140, 200.11, 126, 326–358, 133–139; 345/117–120, 134, 131, 127, 121; 364/525, 118, 554, 514 R, 514 B, 550, 551.01

[56] References Cited

U.S. PATENT DOCUMENTS

| | | | |
|---|---|---|---|
| 3,406,387 | 10/1968 | Werme | 340/324 |
| 4,217,642 | 8/1980 | Dam et al. | 395/140 X |
| 4,442,495 | 4/1984 | Sukonick | 345/121 X |
| 4,720,703 | 1/1988 | Schnarel, Jr. et al. | 345/121 X |
| 4,847,785 | 7/1989 | Stephens | 395/161 X |
| 4,876,651 | 10/1989 | Dawson et al. | 395/126 X |
| 4,893,258 | 1/1990 | Sakuragi | 395/139 |
| 4,896,291 | 1/1990 | Gest et al. | 395/353 |
| 4,901,221 | 2/1990 | Kodosky et al. | 395/349 |
| 4,902,469 | 2/1990 | Watson et al. | 364/525 |
| 4,914,568 | 4/1990 | Kodosky et al. | 395/349 |
| 4,961,072 | 10/1990 | Sekikawa | 395/134 X |
| 4,974,173 | 11/1990 | Stetik | 395/331 |
| 4,991,117 | 2/1991 | Iwamura et al. | 395/134 |
| 5,021,989 | 6/1991 | Fujisawa et al. | 395/350 |
| 5,039,937 | 8/1991 | Mandt et al. | 395/157 X |
| 5,062,060 | 10/1991 | Kolnick | 395/339 |
| 5,191,645 | 3/1993 | Carlucci et al. | 395/328 |
| 5,202,961 | 4/1993 | Mills et al. | 395/328 |
| 5,237,648 | 8/1993 | Mills et al. | 395/133 |
| 5,261,044 | 11/1993 | Dev et al. | 395/159 |
| 5,301,301 | 4/1994 | Kodosky et al. | 395/161 X |
| 5,463,731 | 10/1995 | Diec et al. | 395/161 |

OTHER PUBLICATIONS

Advanced Interface Design Guide, IBM, Jun. 1989, pp. 29–31, 59–61.

Min–Max Slider, IBM Tech. Discl. Bull., IBM Corp., p. 1, Aug. 1990.

Macintosh System Software User's Guide v.6.0, Apple Computer, Inc., 1988, pp. 14–43, 148–150.

Callery et al, "Speaking of Graphics", At, May 1988, p. 111(4).

(List continued on next page.)

*Primary Examiner*—John E. Breene
*Attorney, Agent, or Firm*—Kenyon & Kenyon

[57] ABSTRACT

A system monitoring device has the capacity of displaying historical or real time information and also allows a user to set, via direct manipulation, a range of values in relation to other currently displayed information in graphical format on a computer screen and to view such relationships in an intuitive manner. A user interface is provided so a user can interact with information being viewed via an input device, e.g., a pointing device. The user interface of the system monitoring device of the present invention includes two interactive icons allowing a user to select and display information contained in a historical record, or log, of information, as well as real time information, and also to expand the interactive icon into a range of values, specifying a minimum and maximum, so that there is a range between the point at which the activity may take place and the point at which the activity is canceled which a user can directly manipulate in an intuitive manner on a display device. One of the interactive icons may be displayed as a film editor metaphor with a magnifying glass and two spools.

26 Claims, 27 Drawing Sheets

OTHER PUBLICATIONS

Conforti, "CAD and Mouse", Mac User, Jul. 1988, p. 156(9).

Thornberg, "Learning Curve", At, Mar. 1988, p. 89(4).

Murie, "Director Steps Up Multimedi", May 1989, p. 44(2).

Trivette, "Electronic Encyclopedias Merge Text, High-res Visuals, and Sound", PC Mag., Sep. 1990, p. 157(2).

Potmesil et al, "Frames", abstract, Jul. 1987, pp. 85-93.

Microsoft Paintbrush, Microsoft, 1986, pp. 67-69.

DeJean, "Versa CAD Brings Powerful 2-D CAD to the Macintosh", PC Week, Apr. 1988, p. 72(3).

Case et al, "Keeping It Simple" Unix Review, Mar. 1990, p. 60(8).

Cohen, "Science Toolkit Lets you Explore the World of Physics" PC Magazine, Feb. 1989, p. 436(1).

Deneault et al "An Integrated Display for Patient Monitoring", IEEE Conf. Nov. 1990 pp. 515-517.

Roth, "Grade-A Gray Scale", Mac World, Oct. 1990, p. 209.

Rymer, "Net Visualyzer", Patricia Seybold's Network Monitor, Sep. 1990, p. 21(2).

Rizzo, "The Labtop Mac", Mac User, Jul. 1989, p. 90(13).

Wylie, "MacMeter Tracks Mac CPU Usage", Mac Week, Dec. 1990, p. 26(1).

"Coming Next Month", Lan Magazine, Dec. 1990, p. 116(1).

DECmcc Basic Management System Use, Digital Equipment corporation, Order Number AA-PG5FA-TE, Mar. 1991.

Gettys, Jim et al, "Xlib-C Language X Interface" (Version 11, Relese 4), Massachusettes Institute of Technology and Digital Equipment Corporation, pp. I-X and 1-51, 1989.

Scheifler, Robert W., "X Window System" (Version 11, Release 3, Massaachusettes Institute of Technology, pp. 1-86, 1988.

Linton et al "Composing User Interfaces with Interviews", IEEE Computer, Feb. 1989, pp. 8-22.

"LabView: Laboratory Virtual Instrument Engineering workbench", Byte, Sep. 1986, pp. 84-92.

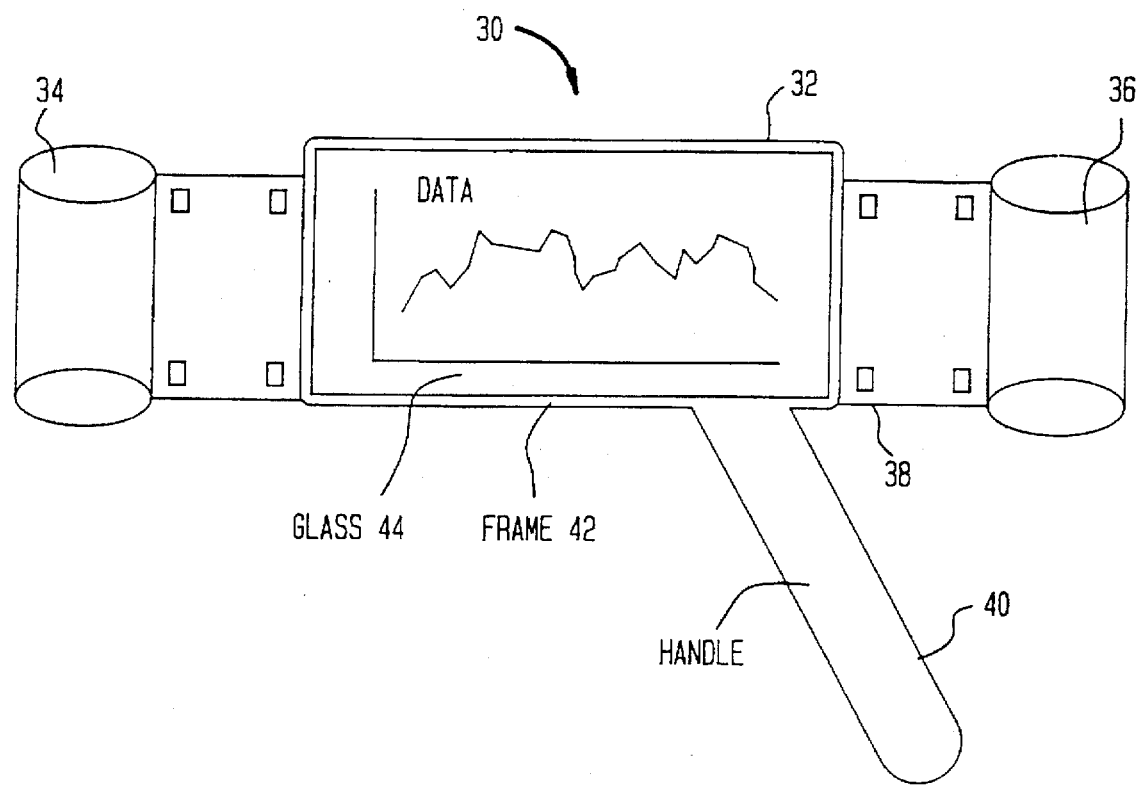

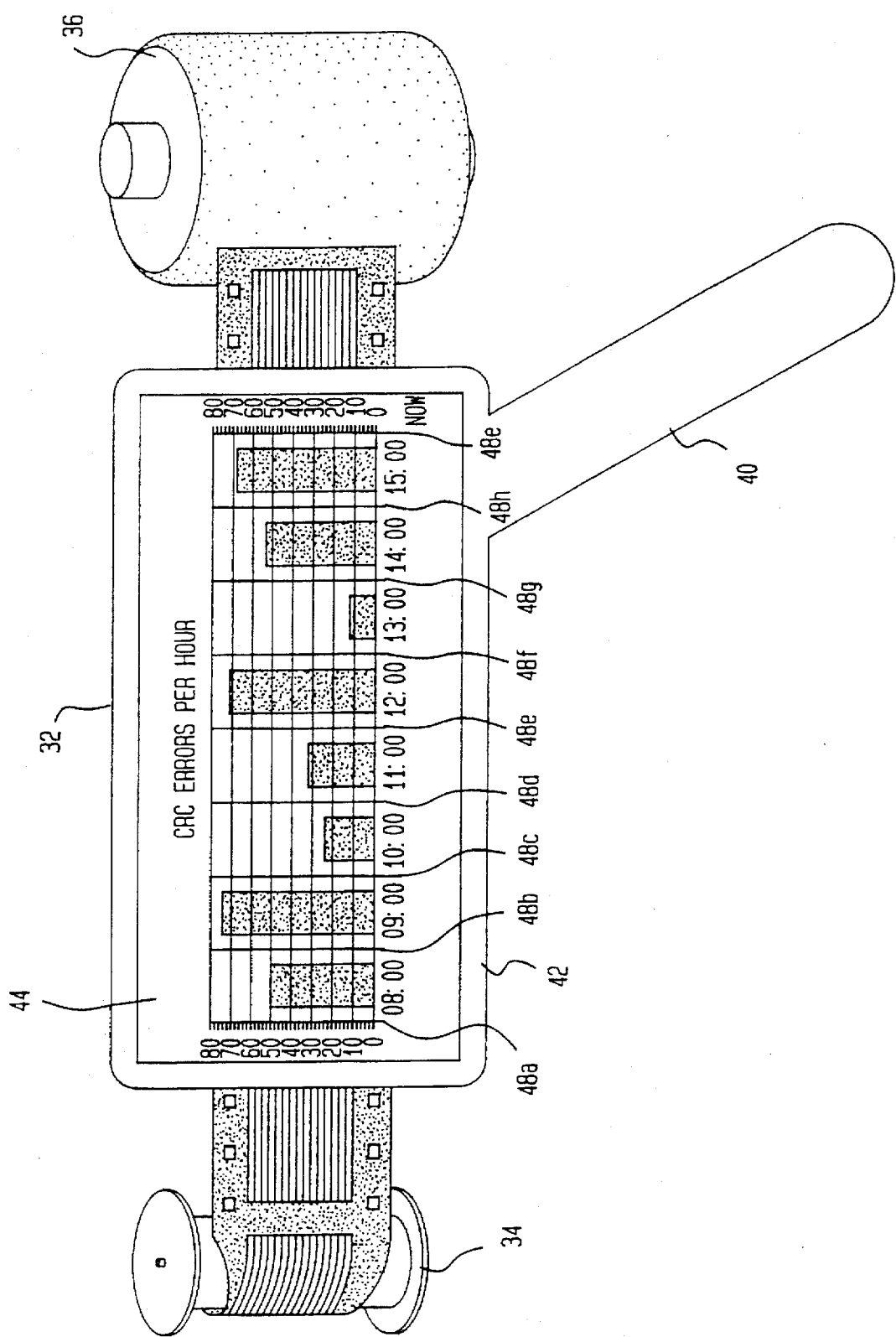

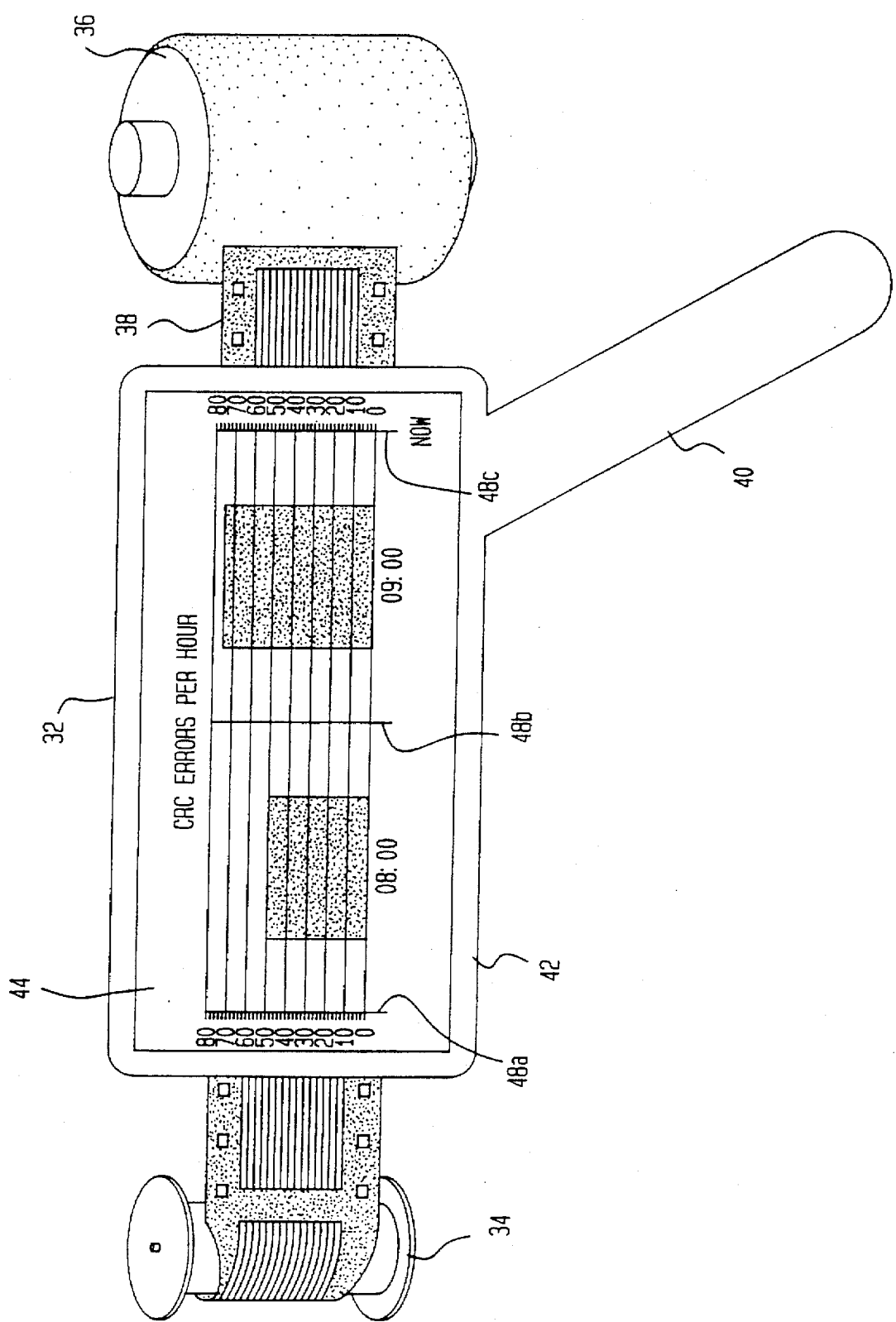

SOUND ALARM WHEN VALUE RISES ABOVE: 42
CANCEL ALARM WHEN VALUE FALLS BELOW: 42

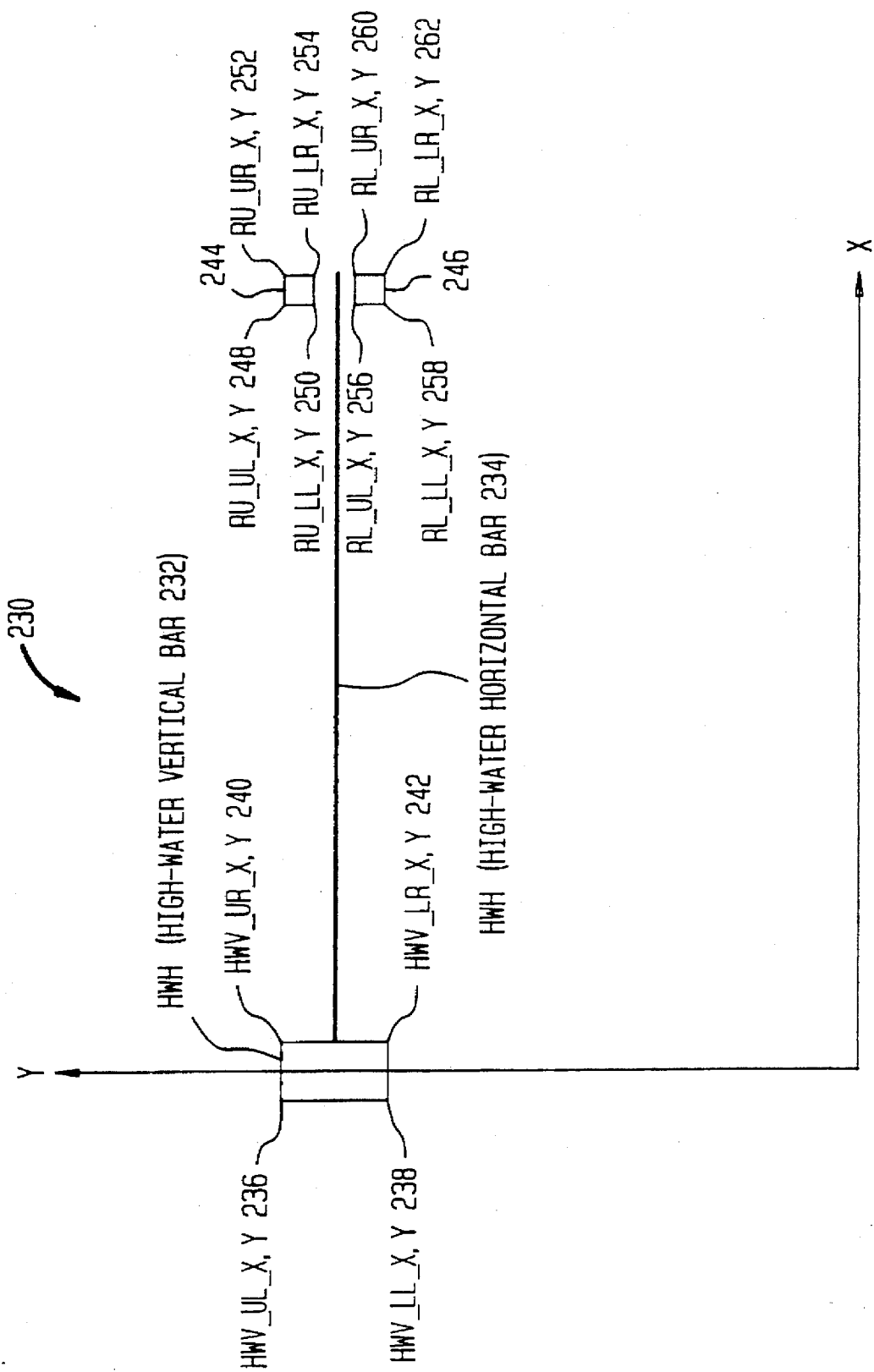

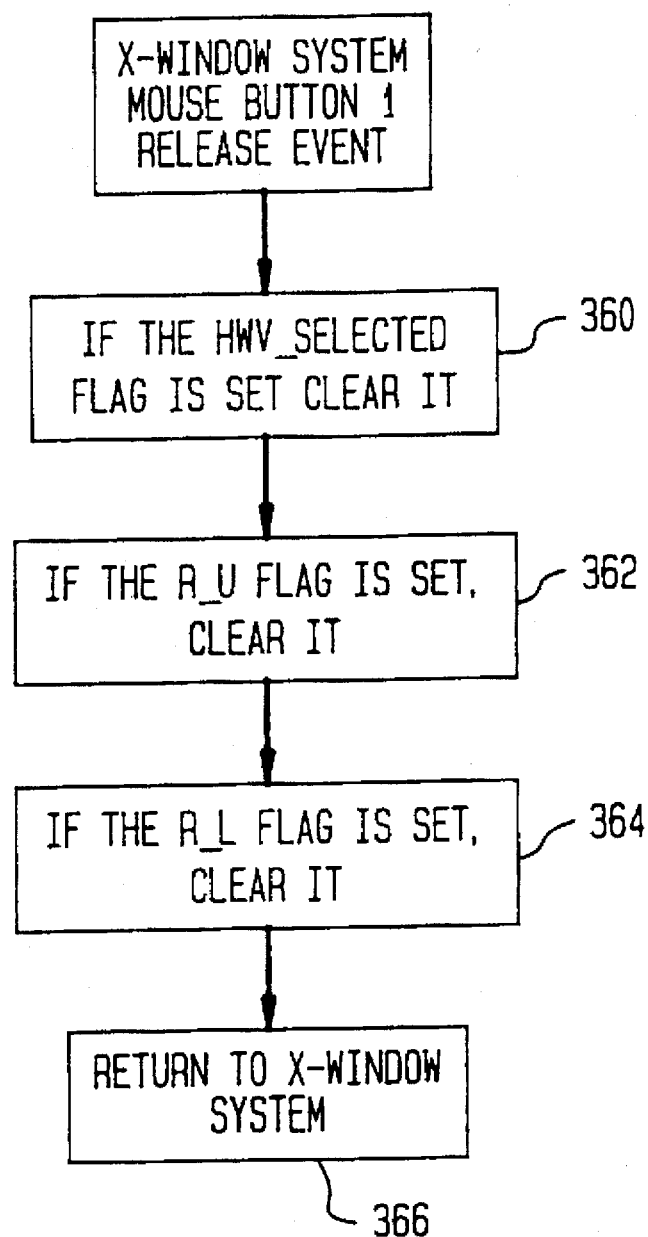

METHOD AND DEVICE FOR MONITORING, MANIPULATING, AND VIEWING SYSTEM INFORMATION

RELATED U.S. PATENT APPLICATIONS

The present application is a continuation of U.S. patent application Ser. No. 07/710,135, now U.S. Pat. No. 5,375,199, filed on Jun. 4, 1991, by Harrow et al., entitled "A System Monitoring Method and Device Including a Graphical User Interface to View and Manipulate System Information."

FIELD OF THE INVENTION

The present invention relates to a system monitoring device, and, more particularly, a system monitoring device that includes a user interface to a computer system which allows a user to view information in an intuitive manner.

BACKGROUND OF THE INVENTION

There are many types of system monitoring devices which provide a user with the ability to review activities of a system. Providing such ability to a system monitoring device enhances its effectiveness as a diagnostic tool and increases a user's ability to control and maintain the monitored system. There are a number of different types of system monitoring devices which can be utilized to monitor the performance of a system. The device chosen for such monitoring typically depends upon the complexity of the activity being monitored as well as the selected device for displaying the monitored activity to a user. For example, in monitoring the flow of traffic in a computer network, the performance of the network can be monitored by sophisticated software or by an operator trained on a system monitoring device which is monitoring the computer network.

The display of the information in a meaningful fashion is an integral part of a system monitoring device. This is especially true when either the system monitoring device or the system being monitored is a computer based system and also where information lends itself to being displayed in graphical form on the system monitoring device. Data displayed in graphical form can render otherwise meaningless numbers into a form that is comprehensible to a user. In such case, a goal of user interface programming is to display the information in a clear format on a display device, such as a video display terminal. In such a system, if the user desires to either control the information or the process being displayed, the user usually needs to become familiar with the particular computer system that is displaying the information. Therefore, these users might need to become "fluent" in the command structure and language of the particular computer system being used.

To reduce the learning curve in training new users on different system monitoring devices wherein the device is a computer system, a goal is to develop "user-friendly" systems. An example of an advance in user interface programming for computer systems is the use of "windows" to display data on a screen of a video display terminal. A window is an array of pixels which may be partially or wholly visible on the screen of a video display terminal depending upon the size of the window relative to the physical dimensions of the display screen. There are a number of commercially available windowing systems, e.g., DECWindows® graphics applications from Digital Equipment Corporation, Microsoft® Windows graphics applications from the Microsoft® Corporation and Macintosh® graphics applications from the Apple® Corporation. Windowing systems provide a user interface to a workstation and perform tasks such as processing user-initiated functions and displaying data on the screen.

Each one of the foregoing windowing systems provides the user with the ability to utilize a pointing device to manipulate information on a display screen of a video display terminal in a workstation. The user is able to manipulate information displayed on the screen by utilizing the pointing device to position a cursor, referred to as the "pointing device cursor," over the displayed information and depress a button on the pointing device. This user action will cause the windowing system to process the request, e.g., by directing the processing to a specific application program dedicated to perform such processing.

There are many occasions where a user utilizing a system monitoring device desires to define a range of values in relation to some set of presented graphical data which relates to a monitored system. Traditional command line user interfaces typically present data in tabular form and allow textual commands to set conditions. Set forth below is an example of the interaction between computer and user in such user interfaces. The user enters a command after the ">>" prompt. The information that follows on the succeeding lines is displayed on the screen of a user's work station in response to the commands entered by the user.

```
>> SHOW ERRORS/CRC
CRC Errors per Hour:
08:00 AM   50
09:00 AM   75
10:00 AM   25
11:00 AM   30
>> SET ALARMON/CRC>85
>> SET ALARMOFF/CRC<55
>> SHOW ALARMON
ALARMON=85
>> SHOW ALARMOFF
ALARMOFF=55
```

Current graphic methods utilizing a windowing environment typically present text boxes for both the high and low values of the user-settable range. The text boxes may or may not be displayed in conjunction with a depiction of the data. Sometimes, along with the ability to select and type values directly into the text boxes, the values within these boxes can also be set using the push buttons of a pointing device to move the values displayed in the text boxes up or down.

Notwithstanding the foregoing advances in user interface programming, it would be highly desirable to have a system monitoring device which allows a user to view either or both historical and real time information, as well as provide a user-with the ability to select a range of values to be displayed on the screen of a system monitoring device reflecting system performance in an intuitive manner, without the need for a user to be trained to use the system monitoring device. In particular, it would be highly desirable for such user interface to provide an intuitive relationship with regard to the presented information. In this system, to view information in an intuitive manner, a user who is familiar with a chosen graphical environment would tend to expect that they could directly manipulate and control the information displayed. The more intuitive the process of accessing, displaying, observing historical or real time data and setting values, the less training required, and therefore, the longer the knowledge and/or skills are retained and the easier it is to observe the information being displayed and ascertain its meaning.

SUMMARY OF THE INVENTION

The present invention provides a system monitoring device capable of displaying historical or real time information to a user and also provides a user with the ability to select a range of values to be displayed in an intuitive manner. The system monitoring device of the present invention generally comprises a display device, such as a video display terminal, through which a user can view information and interact with the information being viewed. The display device generally has a processor and memory associated with it and provides a user interface whereby a user can interact with information being viewed via an input device, e.g., a pointing device. Preselected information is transmitted to the display device from the monitored system to facilitate the monitoring process. In an exemplary embodiment of the system monitoring device of the present invention, the system being monitored is a computer network.

Upon receiving the preselected information transmitted from the monitored system, the processor of the display device stores the information in the memory associated with the display device. Once received, this information can be immediately displayed directly on the display device or it can be stored and retrieved for displaying later by the user. In either case, the information is recorded, i.e., stored in the memory or on a disk drive associated with the display device.

The user interface of the system monitoring device of the present invention includes two interactive icons which are defined as graphic or pictorial representations of information displayed on a display device which can be directly manipulated, moved and changed by a user and thereby alter the view into the underlying information represented by the icons. The first interactive icon allows a user to select and display in an intuitive manner on the display device, information contained in an historical record, or log, of information, as well as real time information. The second interactive icon allows a user to set, via direct manipulation, a range of values in relation to other currently displayed information on a display device such as a video display terminal and to view such relationships in an intuitive manner. The interactive icons are intuitive in the sense that a user familiar with a chosen graphical environment would tend to expect that he/she could directly manipulate the interactive icons with a pointing device.

The first interactive icon of the user interface of the present invention comprises an image or metaphor of a film editor of 35 mm movie film divided into a plurality of frames which includes a metaphor of a magnifying glass placed over the 35 mm movie film. The "frames" provide a visual metaphor to display information to a user on the display device. The film is stretched between a supply spool and a take-up spool. A user can cause the film to be rolled in and out of the supply and take-up spools to allow a user to view different frames of information. The present invention allows a user to view information from the monitored system on the "film portion" through the "glass portion" of the first interactive icon by metaphorically placing one or more units of information, in either graphical or textual form, in one or more of the plurality of frames which represent a "snapshot" of information for a given unit, e.g., time. The first interactive icon provides an intuitive window into the information displayed on the film.

The information and the first interactive icon can be displayed on the display device in either a vertical or horizontal direction depending on the type of information being viewed. For example, if the system monitoring device is monitoring activities which can be represented in graphical form, then the information and the first interactive icon can be arranged in a horizontal direction. If the system monitoring device is monitoring activities which can be more appropriately represented as textual information, then the information and the first interactive icon can be arranged in a vertical direction. The utilization and performance of the information displayed and the first interactive icon is the same notwithstanding which orientation is chosen.

To change the view into the recorded information as displayed through the first interactive icon on a display device, the user interface of the system monitoring device of the present invention further provides a user with the ability to "grab" the "magnifying glass portion" of the first interactive icon using a pointing device to move, or "drag," the "magnifying glass portion" of the first interactive icon along a longitudinal axis of the "film portion" of the first interactive icon to examine different frames of information on the film. The user can move the "magnifying glass portion" of the first interactive icon in either direction along the longitudinal axis within the area of the film displayed to view either information that has passed out of view of the first interactive icon, i.e., older data, or information which has not yet been displayed to a user through the first interactive icon but is stored in memory associated with the display device. As the user moves the "magnifying glass portion" of the first interactive icon over the information within the displayed frames or, when touching either spool, the "film portion" rolls from either the supply or take-up spool to the other spool depending on which direction the user moves the "magnifying glass portion" of the first interactive icon. Thus, the user can reach the desired location within the recorded information to display the information of interest.

Moving the "film portion" of the first interactive icon under the "magnifying glass portion" of the first interactive icon effectively alters the variable, e.g., time, which is represented by the longitudinal axis. The user interface of the present invention allows a user to alter the scale of the variable represented by the axis which in turn alters, i.e., magnifies or reduces, the amount of data displayed on the "film portion" of the first interactive icon under the "magnifying glass portion" of the first interactive icon. To accomplish this, a user, via a pointing device, grabs any one of a plurality of delineation marks which delineate the scale of the axis and drags the mark in either direction along the longitudinal axis. Dragging a delineation mark in a first direction narrows the space occupied by each piece of information represented on the "film portion" of the first interactive icon, thereby increasing the amount of information displayed through the "magnifying glass portion" of the first interactive icon. Dragging a delineation mark in a second direction widens the space occupied by each piece of information represented on the "film portion" of the first interactive icon, thereby reducing the amount of information displayed through the "magnifying glass portion" of the first interactive icon.

The second interactive icon of the user interface of the present invention, which allows a user to set a range of values in relationship to graphically presented data on a display device, comprises a directly manipulatable "slider portion" along a first axis, for example, a vertical axis, of the graphically displayed data and an "indicator bar portion" along a second axis, for example, a horizontal axis, of the graphically displayed data. The "indicator bar portion" of the second interactive icon can be represented by a thin line when it is in its default condition of supplying a single crossing threshold. The user interface of the present invention provides the user with the ability to "grab" the second interactive icon by the "slider portion" and move it along the first axis to change its setting using a pointing device.

The user interface of the present invention further provides a user with the ability to expand the value of the second interactive icon into a range of values so that there is a range, or hysteresis, between the point at which some activity may take place and the point at which the activity is canceled. A user can directly manipulate the second interactive icon by "dragging" or moving the "indicator bar portion" by positioning the cursor above two small objects (referred to as "first and second handles portions") that appear on the screen of a system monitoring device above and below the "indicator bar portion" of the second interactive icon. The user can drag the "first handle portion" upwards and/or the "second handle portion" of the second interactive icon downwards to increase the width of the "indicator bar portion" which, thereby directly expand the range of values based on the scale of the underlying data. As the transparent "indicator bar portion" of the second interactive icon expands, the "slider portion" of the second interactive icon moves to remain centered within the width of the "indicator bar portion" of the second interactive icon. Dragging the "slider portion" of the second interactive icon into the top or bottom of the underlying graphic display of data causes the scale of the underlying data to expand or contract so that any value on the underlying display of graphical data may be set.

Whatever the width of the second interactive icon, the user can move the range of values represented by the "indicator bar portion" of the second interactive icon along the first axis by dragging the "slider portion" of the second interactive icon, thereby changing the values represented by the "indicator bar portion" but not the width of the range. Also, the user can reselect the second interactive icon at any time, causing the handles portion of the second interactive icon to appear, to change the width of the range as needed.

Thus, by providing a system monitoring device with a user interface that includes interactive icons as described above, the present invention provides an intuitive interface to a user viewing a graphical or textual representation of information displayed on the system monitoring device.

BRIEF DESCRIPTION OF THE DRAWINGS

FIG. 3A illustrates an exemplary first interactive icon utilized in the user interface of the present invention.

FIGS. 4A–4C illustrate how the time scale of the information within the exemplary first interactive icon utilized in the user interface of the present invention is altered.

FIG. 14 is an illustration of the exemplary second interactive icon utilized in the user interface of the present invention illustrated in FIG. 10A reproduced over an x,y coordinate system.

FIG. 19 illustrates the processing flow user-initiated action for terminating the processing of movement of a portion of the exemplary second interactive icon utilized in the user interface of the present invention.

DETAILED DESCRIPTION

Figure 1:
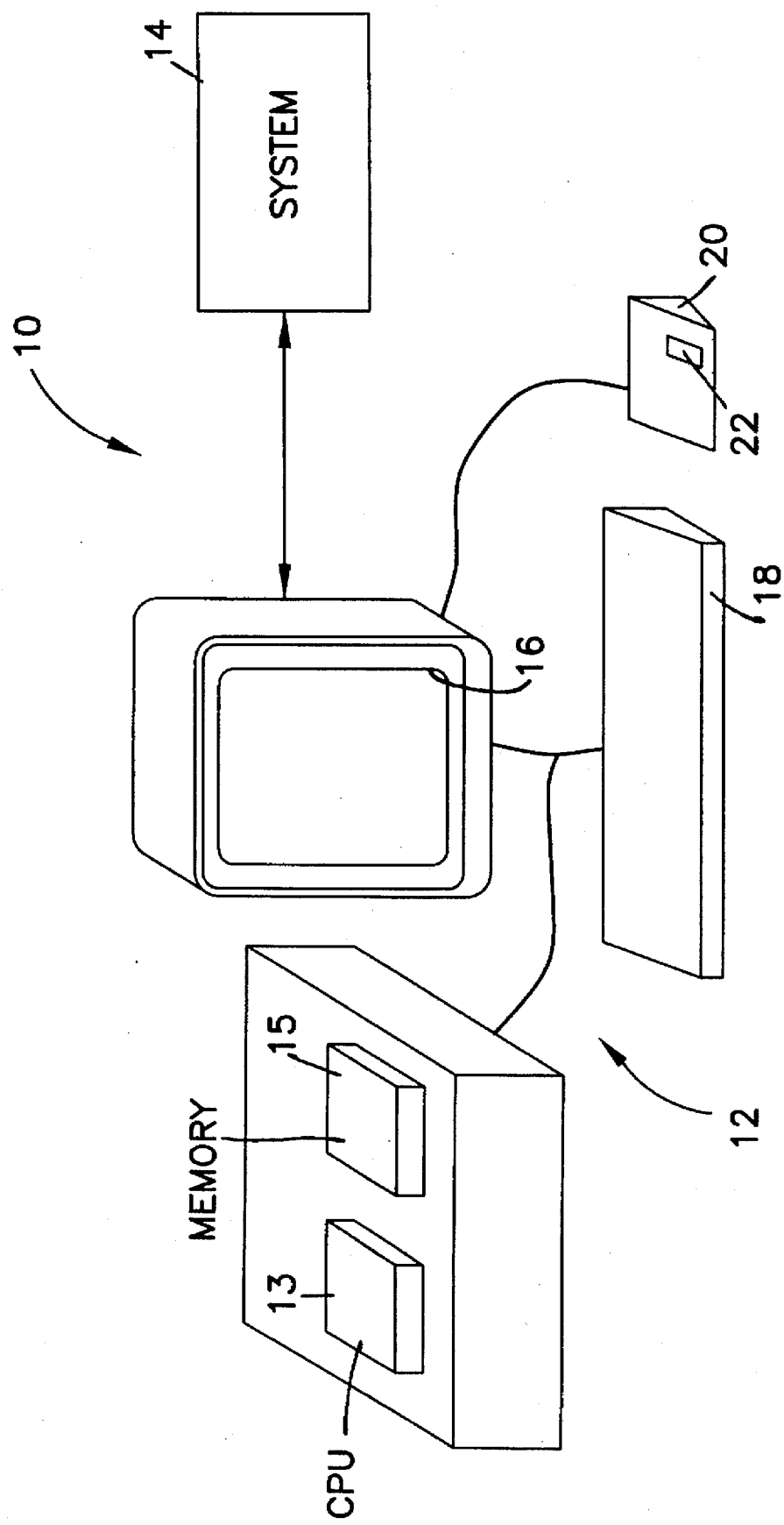
FIG. 1 illustrates an exemplary embodiment of a system utilizing the system monitoring device of the present invention.

Referring now to the drawings, and initially to FIG. 1, there is illustrated an exemplary embodiment of a system utilizing the system monitoring device of the present invention. The system monitoring device 10 comprises a display device 12 coupled to a monitored system 14 which could be a computer network, a device in a computer network, a computer operating system, a processing chamber where gases are mixed, etc. The display device 12 for monitoring includes a processor 13, memory 15, a screen 16, a keyboard 18 and a pointing device 20, e.g., a mouse.

The system monitoring device 10 is configured so that preselected information is transmitted from the system 14 and is received by the display device 12 depending on the type of activities chosen to be monitored. The information received by the display device 12 is processed by the processor 13 and stored in the memory 15 associated with the display device 12. Once received, this information can be immediately displayed directly on the screen 16 or it can be stored and retrieved later by the user. In either case, the information is recorded, i.e., stored in the memory 15 associated with the display device 12.

Figure 2:
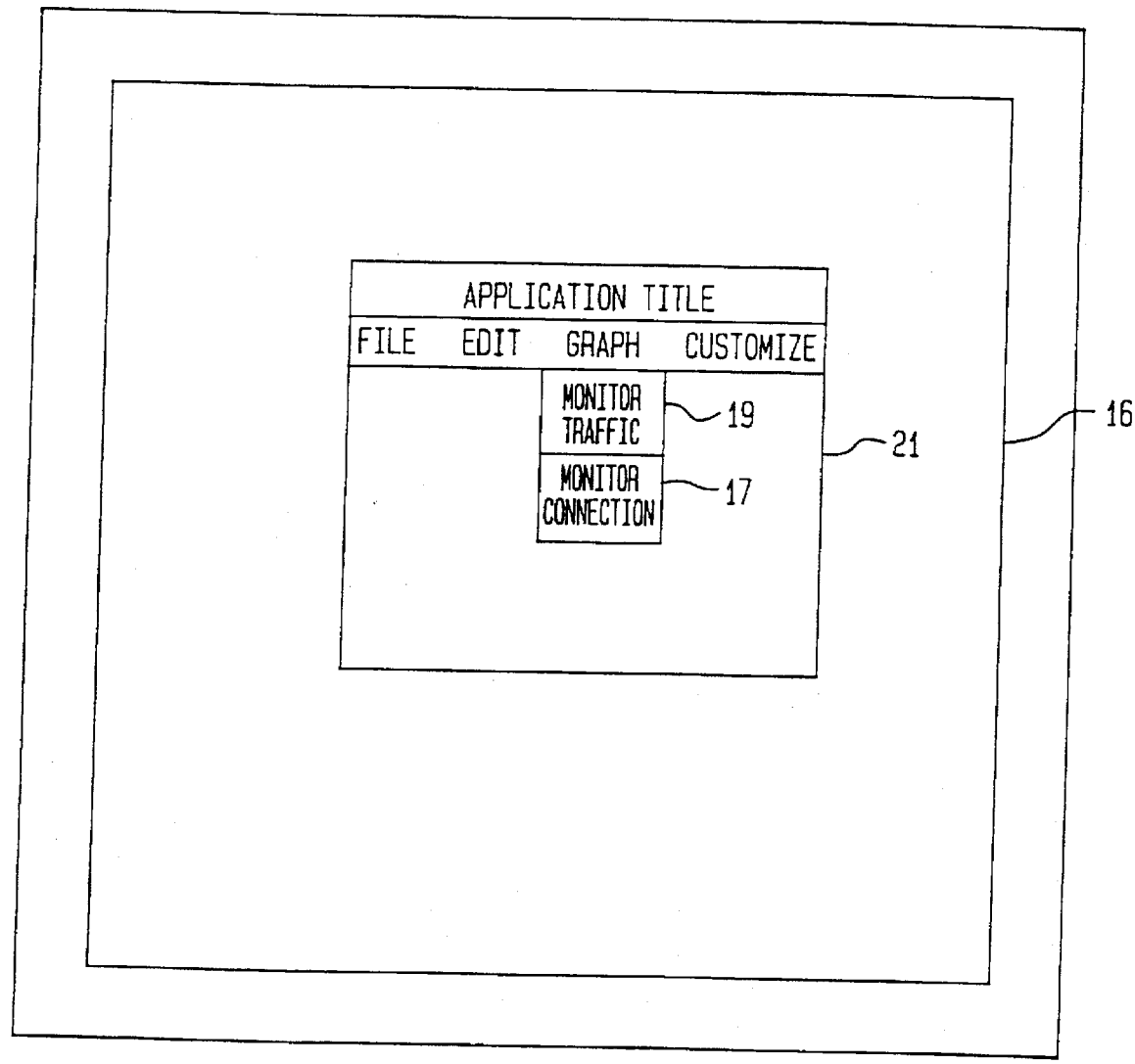
FIG. 2 illustrates an exemplary selection process performed by a user on the exemplary embodiment of a system utilizing the system monitoring device of the present invention.

Once the user decides to view the information from the system being monitored, he must select to have the information displayed. This is accomplished by invoking a program from a menu which will present the data in either graphical or textual format. Reference is now made to FIG. 2 to illustrate an example of the selection process. In this example, a user pulls down a menu by positioning a cursor referred to as the "pointing device cursor" on the screen 16 over a menu box 19 displayed on the screen 16 in a window 21 and selects the option of graphing the data of interest, e.g., the traffic on a network, by depressing or clicking a select button 22 (FIG. 1) on the pointing device 20 (FIG. 1). This will cause a graphical or textual representation of the desired information or data to be displayed on the screen 16.

When the user chooses to display the information, the user interface of the system monitoring device of the present invention provides for an "interactive icon" which is used herein to mean a graphic or pictorial representation on a display device of information displayed which can be directly manipulated, moved and changed by a user. As a result, a portion of the interactive icon may be directly manipulated. Thus, the interactive icon enables a user to view the information from the system 14 (FIG. 1) on the screen 16 in an intuitive manner in the sense that a user who is familiar with a chosen graphical environment would tend to expect that he could directly manipulate the interactive icon with a pointing device. Thus, a user is able directly to manipulate the interactive icon to display either historical or real time information or both received from the system 14 in either graphical or textual form.

Referring now to FIG. 3A, there is illustrated a first exemplary interactive icon 30 provided by the user interface of the present invention. The interactive icon 30 is a metaphor of a film editor of 35 mm movie film and includes a magnifying glass image 32, a take-up spool image 34, a supply spool image 36, and a camera film 38. The camera film 38 is stretched between the take-up spool image 34 and the supply spool image 36 and is divided into a plurality of frames (see FIG. 3C), each frame conceptually holding a unit of information from the monitored system 14 (FIG. 1). The frames provide a visual metaphor to display information to a user on the screen 16. Utilizing the metaphor of a film editor, the blank film (not shown) contained in the supply spool image 36 is "displayed" as it exits the supply spool image 36 by organizing, as for example by time, the units of information from the monitored system 14 and "placing" one or more of the units of information sequentially in frames of the camera film 38 as they exit the supply spool image 36 on the screen 16 of the display device 12. Typically, the frames of the film 38 are delineated on a per unit time basis.

The statement that one or more units of information are "placed" in one or more of the plurality of frames as used throughout this application refers only to the visual metaphor provided by the frames for displaying data to a user and enhancing the notion of motion of data traveling underneath the magnifying glass image 32 and does not mean that data is physically placed in the frames or that the frames contain data. The frames are a metaphorical vehicle for displaying information to a user on the display device 12 in an intuitive manner.

As viewed by a user on the screen 16 (FIG. 1), the frames of information from the system 14 march leftwards from the supply spool image 36 to the take-up spool image 34 where the information is "wound up" on the take-up spool image 34. The film 38 is logically wound so that it no longer appears on the screen 16 to make room for additional information being introduced in new frames from the supply spool image 36. The information which no longer appears on the screen 16, however, is still in the memory 15 associated with the display device 12 and can be brought back to the screen 16 by a user. If the information being displayed on the film 38 is historical, then the most recent information will be the information that has just exited the supply spool image 36. If the information is being displayed in real time, then "now" is represented by the information contained in frames immediately exiting the supply spool image 36, with historical data marching towards the take-up spool image 34.

It should be understood that the directional sense of the movement of the film 38 of the first interactive icon from right to left could also be chosen to move from left to right to allow for cultures that read in the opposite direction. In such case, the supply spool image 36 would then be on the left and the take-up spool image 34 would be on the right.

The information and the interactive icon 30 can be displayed on the display device 12 (FIG. 1) in either a vertical or horizontal direction depending on the type of information being viewed. For example, if the system monitoring device 10 is monitoring activities which can be represented in graphical form, then the information and the interactive icon 30 can be arranged in a horizontal direction. Whereas, if the system monitoring device 10 is monitoring activities which can be more appropriately represented by textual information, then the information and the interactive icon 30 can be arranged in a vertical direction. The utilization and performance of the information displayed and the interactive icon 30 is the same notwithstanding which orientation is chosen.

The magnifying glass image 32 of the interactive icon 30 includes a handle 40, a border 42, and a glass portion 44. Both the handle 40 and the border 42 can be directly manipulated by a user via the pointing device 20 (FIG. 1) as described below. The magnifying glass image 32 "graphically magnifies" information, in a metaphorical sense, conceptually depicted under the frames lying beneath the glass portion 44 of the magnifying glass image 32. It is through the glass portion 44 of the magnifying glass image 32 that a user defines "a scope of interest" which is representative of the information from the system 14 being monitored that the user is interested in viewing at a given time. That is, by directly manipulating the magnifying glass image 32, the user can view either historical or real time information of interest.

Figure 3B:
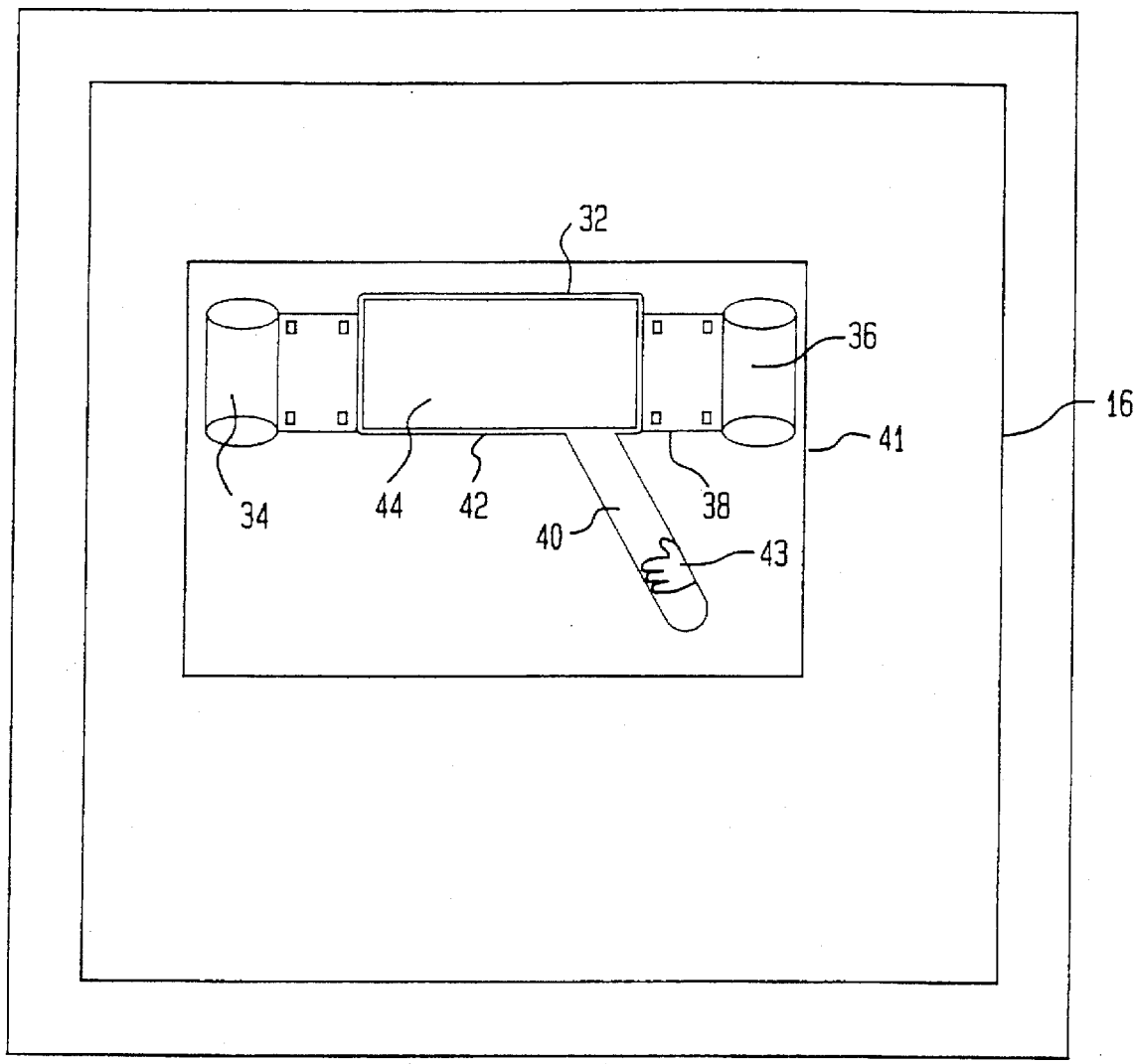
FIG. 3B illustrates an exemplary first interactive icon utilized in the user interface of the present invention with a pointing device cursor illustrated as a grabber hand.

Referring now to FIG. 3B, there is illustrated the first exemplary interactive icon of FIG. 3A as it would appear in a window 41 on a screen 16 of a display device 12. As illustrated in FIG. 3B, the present invention provides a user with the ability to change the temporal view into the recorded information by allowing the user to "grab" the magnifying glass image 32 by its handle 40 or the border 42 and move it along the film 38 to examine different "snapshots" of information conceptually represented by the frames of the film 38 using the pointing device 20 (FIG. 1), e.g., a mouse. To move the magnifying glass image 32, the user positions the cursor, hereinbefore referred to as the "pointing device cursor," over the handle 40 or the border 42 and then depresses a select button 22 on the pointing device 20 indicating that the pointing device 20 is activated. The user can then drag the magnifying glass image 32 along an axis defined by the positioning of the film 38 to change its position. The pointing device cursor changes to a "grabber hand" 43 whenever the cursor is over the handle 40 to give an indication that it can be moved. A user will be unable to drag the magnifying glass 32 if the pointing device cursor is not positioned over either the handle 40 or the border 42.

Figure 3C:
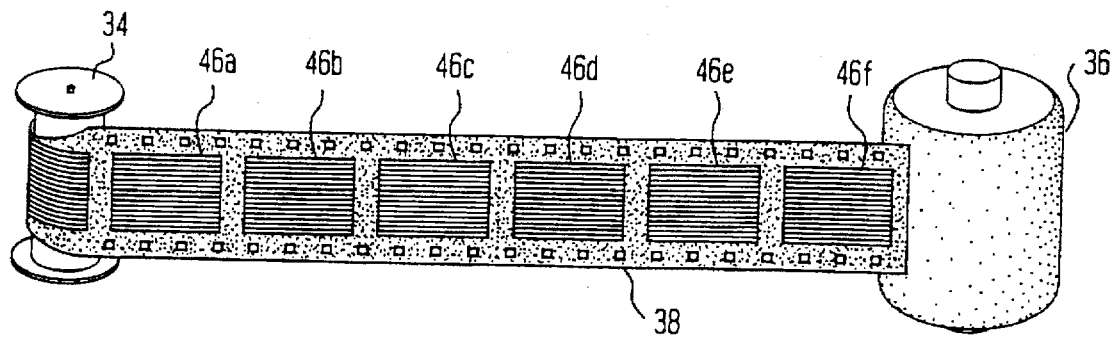
FIG. 3C illustrates a portion of the exemplary first interactive icon utilized in the user interface of the present invention.

Referring now to FIG. 3C, there is illustrated a portion of the interactive icon 30 of the user interface of the system monitoring device of the present invention. FIG. 3C shows the interactive icon 30 of FIG. 3A minus the magnifying glass image 32 more clearly to illustrate the metaphor of displaying 35 mm film. The film 38 is divided into a plurality of frames 46a–46f. The information from the system 14 (FIG. 1) being monitored is conceptually represented in the plurality of frames 46a–46f, plus any additional frames already wound onto the take-up spool image 34. The information displayed is typically divided into a frame as a function of time so that the film 38 conceptually represents scrolling snapshots of the activity being monitored at preselected time intervals.

As described above, the user can move the magnifying glass image 32 (FIG. 3A) in either direction within the area of the film 38 displayed on the screen 16 of the display device 12 (FIG. 1) between the supply spool image 36 and the take-up spool image 34. If in the course of dragging the magnifying glass image 32, the user drags the magnifying glass image 32 into either the supply spool image 36 or the take-up spool image 34, the film 38 will wind under the magnifying glass image 32 causing the displayed information to scroll in the opposite direction. Thus, if the magnifying glass image 32 is pushed against the take-up spool image 34 indicating that the user wishes to display information for earlier time periods, the film 38 winds towards the supply spool image 36 to bring earlier recorded frames of information under the magnifying glass image 32. Conversely, if the user drags the magnifying glass image 32 against the supply spool image 36, the film 38 winds leftwards onto the take-up spool image 34 to show later information.

The "harder" the user drags the magnifying glass image 32 against either the supply spool image 36 or the take-up spool image 34, (hardness being considered as the distance the user attempts to drag the magnifying glass image 32 into the supply spool image 36 or take-up spool image 34), the faster the film winds. When the user reaches the temporal location of interest within the recorded data, he/she slows or stops the movement of the film by dragging the magnifying glass image 32 back into the area between the supply spool image 36 and the take-up spool image 34 to thereby display the information of interest. The user releases the mouse button when the desired information is displayed to end the movement of the magnifying glass image 32 or the film 38. The film 38 stops moving when the earliest or latest information recorded, i.e., information stored in memory 15, is reached while the user is dragging the magnifying glass image 32.

The user is also able to drag or hold the magnifying glass image 32 against either the supply spool image 36 or the take-up spool image 34 to watch the information go by at a constant, user-defined rate. To accomplish this, the user depresses a select button 22 on the pointing device 20 indicating activation of the pointing device 20, drags the magnifying glass image 32 in the direction desired, and then releases the button of the pointing device 32 while the magnifying glass image 32 is still in motion. This will cause the film 38 to wind under the magnifying glass image 32 at a rate relative to the speed at which the magnifying glass image 32 was dragged by the user. A user-settable preference allows the film to continue moving once the magnifying glass image 32 is dragged and released while in motion until the user stops the movement by clicking the pointing device 32, i.e., depressing and then releasing the select button 22 on the pointing device 20, for frictionless movement. Alternatively, the film 38 will begin slowing down as if by friction once the magnifying glass image 32 is dragged and released while in motion at a rate set by the user.

Moving the film under the magnifying glass image 32 as described above effectively alters the value of the center point of the information displayed with respect to the variable represented by the direction in which the magnifying glass image 32 is moved. This variable could represent time for example. Thus, the information that scrolls across the screen 16 (FIG. 1) on the film 38 is delineated per unit of time. The user can alter the time scale and thereby alter the amount of data displayed within the magnifying glass image 32 of the displayed data.

Figure 4A:
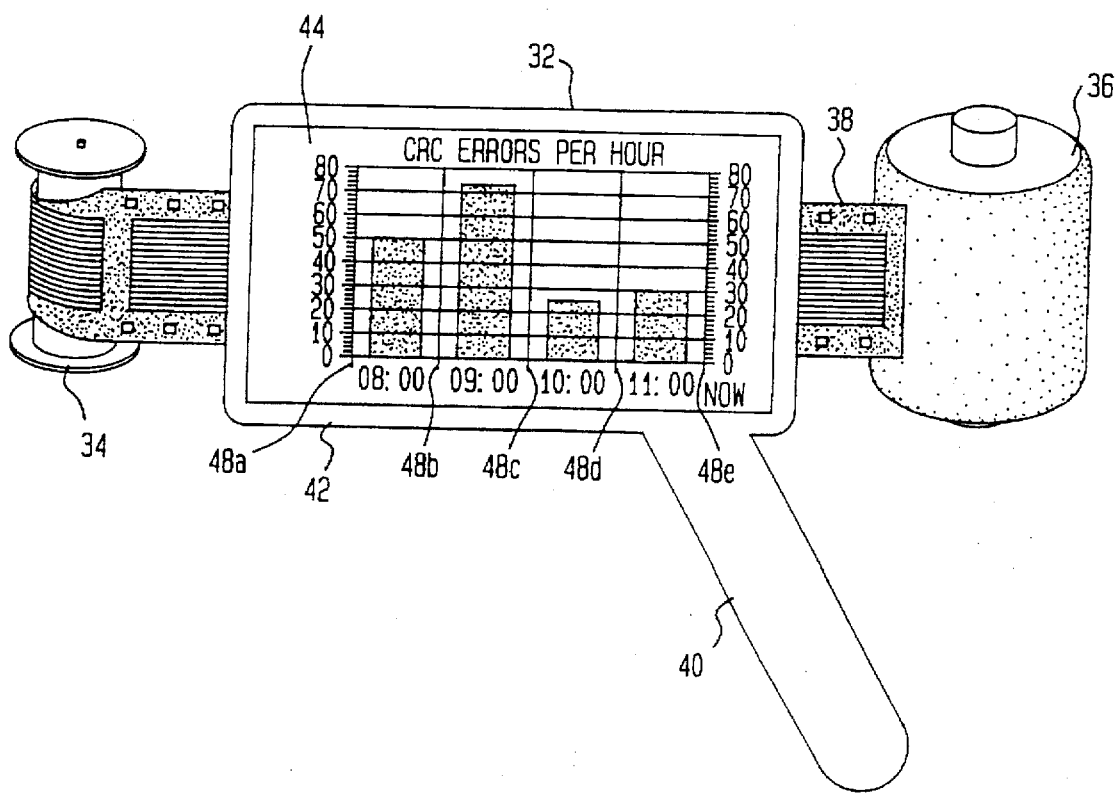

Reference is now made to FIGS. 4A–4C to describe how the time scale is altered. FIGS. 4A–4C illustrate the interactive icon of the user interface of the present invention including an example of graphical information displayed on the film 38 underneath the magnifying glass image 32. The same reference numbers utilized in FIGS. 1, and 3A–3B are used in FIGS. 4A–4C to reference the magnifying glass image 32, the supply spool image 36, the take-up spool image 34, the film 38, the handle 40, the border 42 and the glass portion 44. The information displayed in graphical form is mapped to an x,y coordinate system. The information as illustrated is delineated in both the x and y direction by a plurality of marks hereinafter referred to as tic marks to establish the current width scope of interest on the underlying film 38. Tic marks 48a–48e are shown for illustrative purposes in FIG. 4A.

To alter the time scale, the user grabs any one of the plurality of tic marks 48a–48e below the graph and drags the tic mark toward or away from an adjacent one of the tic marks 48a–48e. Dragging one of the plurality of tic marks 48a–48e in a first direction, e.g., towards the left, narrows the space occupied by each bar thereby increasing the width of the scope of interest and, therefore, increasing the amount of data displayed as illustrated in FIG. 4B. Dragging one of the plurality of tic marks 48a–48e in a second direction, e.g., towards the right, widens the space occupied by each bar thereby decreasing the width of the scope of interest and, therefore, decreasing the amount of data displayed within the magnifying glass as illustrated in FIG. 4C.

Figure 5:
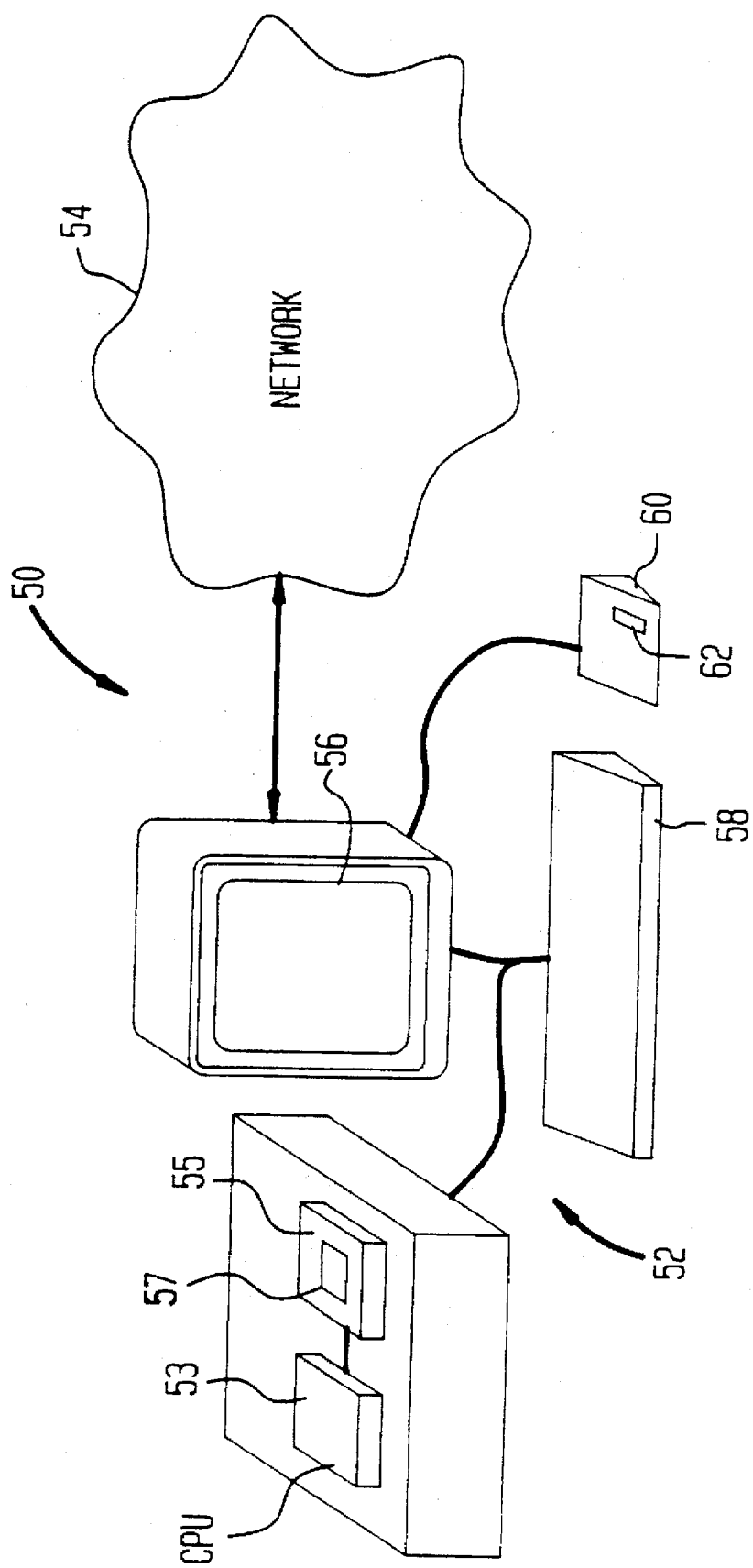
FIG. 5 is an illustration of an exemplary implementation of the present invention.

Referring now to FIG. 5, there is illustrated in block diagram form an example of an implementation of the present invention utilizing the X Window system for monitoring a computer network. The system 50 comprises a workstation 52 coupled to a network 54. The workstation 52 includes a processor 53 which has memory 55 associated therewith. A number of software modules 57 for performing specific tasks are resident in the memory 55 of the workstation 52. The workstation 52 includes a screen 56, a keyboard 58 and a pointing device 60, e.g., a mouse.

In the second exemplary embodiment illustrated in FIG. 5, a windowing system is one of the software modules 57 resident in the memory 55 associated with the workstation 52 is utilized to provide an interface between the user and the workstation 52. In this exemplary embodiment, the X Window system is implemented to perform the windowing and other user interface tasks. The X Window system is fully described in publications published by the Massachusetts Institute of Technology such as *Xlib—C Language Interface Protocol Version* 11 by Jim Gettys, Ron Newman and Robert W. Scheifler and *X Window System Protocol, Version* 11 *Beta Test*, by Robert W. Scheifler. These publications are available to use, copy, modify and distribute for any purpose without any fee. Information on the X Window system may be obtained from the Massachusetts Institute of Technology Laboratory for Computer Science, 545 Technology Square, Cambridge, Mass. 02139.

In the X Window environment, the processing of user-initiated tasks is asynchronous in that different software modules are invoked when specific events occur in a fashion similar to a subroutine call. The X Window system determines which application software module to call to process a specific window event. The X Window system is able to do this because each one of the application software modules are "registered" in the X Window system which enables the X Window system to know which body of software handles the processing of a specific event.

Another one of the software modules 57 resident in the memory 55 associated with the workstation 52 is network management software which provides an interface to the network 54 for the workstation 52. An example of network management software product is "DECmcc"® which is a commercially available product sold by Digital Equipment Corporation. This software module monitors and controls the activities of the network 54 and any device which is part of the network 54.

Utilizing the second exemplary embodiment illustrated in FIG. 5, the following describes how the interactive icon of the present invention is displayed and utilized by the user and the resulting processing that occurs by the X Window system and associated software. First, the user must configure the workstation 52 to monitor for a specific event in the network 54, e.g., the number of CRC (cyclical redundancy checks, a parameter typically monitored in a computer network) errors that occur in the network 54. The workstation 52 will then receive information from the network 54 via the network management software which will document the number of CRC errors over time. This information is stored in the memory 55 associated with the workstation 52. The user can then select the CRC errors to be displayed, e.g., through a menu selection process, which will cause the interactive icon to be displayed over a graphical representation of CRC errors in a window on the screen 56. Before the interactive icon appears on the screen 56, the user selects an option from a menu to display the preselected information, e.g., the user pulls down a menu by positioning the pointing device cursor over a menu box displayed on the screen 56 and selects the option of graphing data of interest by depressing or clicking a button on the pointing device 60. This will cause a graphical representation of the desired data to be displayed in a window on the screen 56. The data depicted in the graph can be real-time data or historical data that was stored in the memory 55. Depending upon the time scale selected by the user, the information displayed under the magnifying glass will look like one of FIGS. 4A–4C.

There are a number of X Window events that are caused by different user inputs via the pointing device 60. When an X Window event occurs, the X Window system determines which applications software module will process the event and then transfers control to that module. The different X Window events are a "mouse button 1 press event", a "mouse button 1 drag event", a "mouse button 1 motion event", a mouse button 1 press/release event" and a "mouse button 1 release event". These events and the processing that occurs as a result of these events, are discussed below in connection with FIGS. 6, 7A–7C, 9 and 10A–10B.

Figure 6:
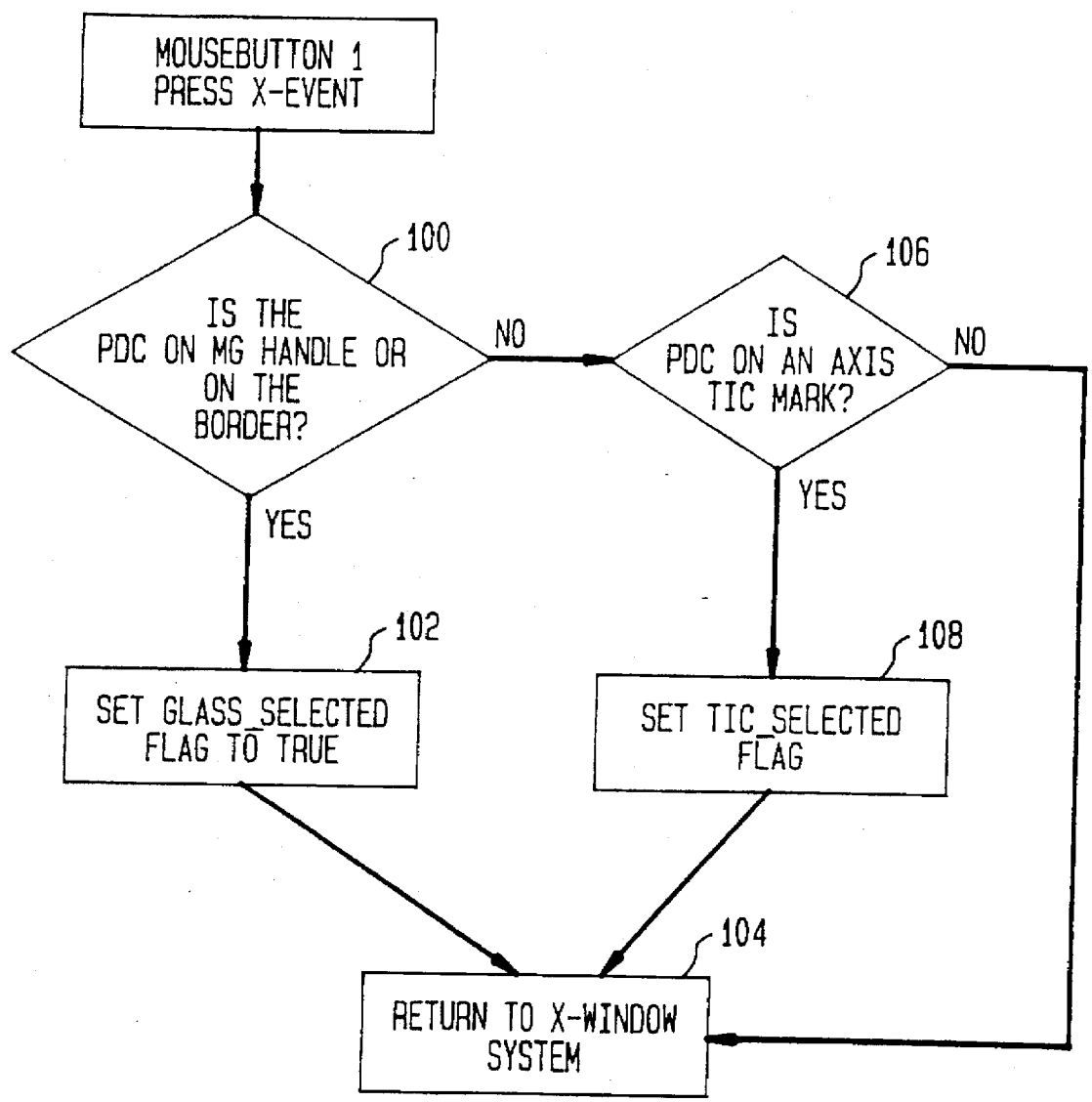
FIG. 6 illustrates the processing flow for user-initiated action for changing the position of a portion of the exemplary first interactive icon utilized in the user interface of the present invention.

Referring now to FIG. 6, there is illustrated the processing flow for user-initiated action on the user's workstation 52 (FIG. 5) for changing the position of the magnifying glass image 32. As discussed above, the user by using a pointing device such as a mouse 60 (illustrated in FIG. 5), can move the magnifying glass image 32 along the film 38 in the horizontal direction. At the moment the pointing device 60 is enabled, i.e., the user has depressed a select button 62, the X Window system ascertains the x,y coordinates which represent the position of the pointing device cursor at that time. The X Window system also ascertains a time stamp which indicates the time when the pointing device 60 is enabled. The enabling of the pointing device 60 is an asynchronous event labeled in FIG. 6 as "mouse button 1 press event". Mouse button 1 is chosen for this example to be the button on the mouse which indicates a user selection. This event is processed by the X Window system which, in turn, transfers processing to the flow illustrated in FIG. 6.

When the X Window system transfers processing to the software module represented by the flow chart in FIG. 6, it passes the x,y coordinates of the pointing device cursor ("PDC") and a time stamp to this software module. In the step indicated as reference numeral 100, the x,y coordinates passed to the module are tested to determine if pointing device cursor is on either the handle 42 or the frame 44 of the magnifying glass image 32 ("MG"). If it is, control is passed to step 102 where a flag entitled "Glass_selected" is set to true. This flag is utilized by the module which processes movement of the magnifying glass image 32 discussed below in connection with FIGS. 7A–7C. Control is then passed back to the X Window system as indicated in step 104.

If it is determined in step 100 that the pointing device cursor is not positioned on either the handle 42 or the frame 44 of the magnifying glass image 32, control is passed to step 106 where it is determined if the pointing device cursor is positioned on an axis tic marks 48*a*–48*e* (FIG. 4A) or on the tic marks of the other axis. If the pointing device cursor is not on one of the axis tic marks 48*a*–48*e*, control is then passed back to the X Window system as indicated in step 104. If it is, control is passed to step 108 where a flag entitled "tic_selected" is set to true. This flag is utilized by the module which processes the alteration of the time scale which is discussed below in connection with FIGS. 7A–7B.

Control is then passed back to the X Window system as indicated in step 104.

Figure 7A:
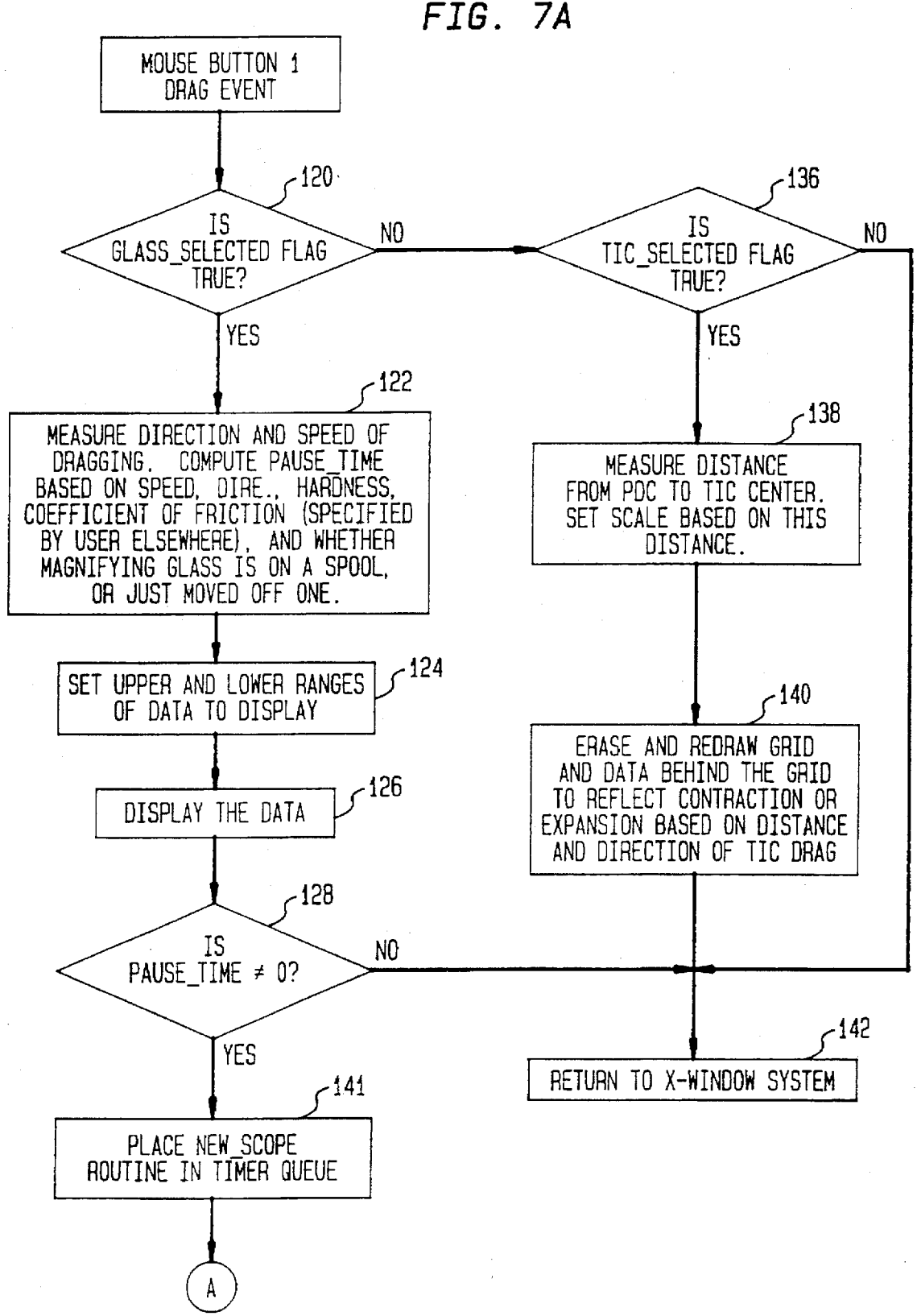
FIGS. 7A–7C illustrate the processing flow for user-initiated action for dragging a portion of the exemplary first interactive icon of the user interface utilized in the present invention.
Figure 7B:
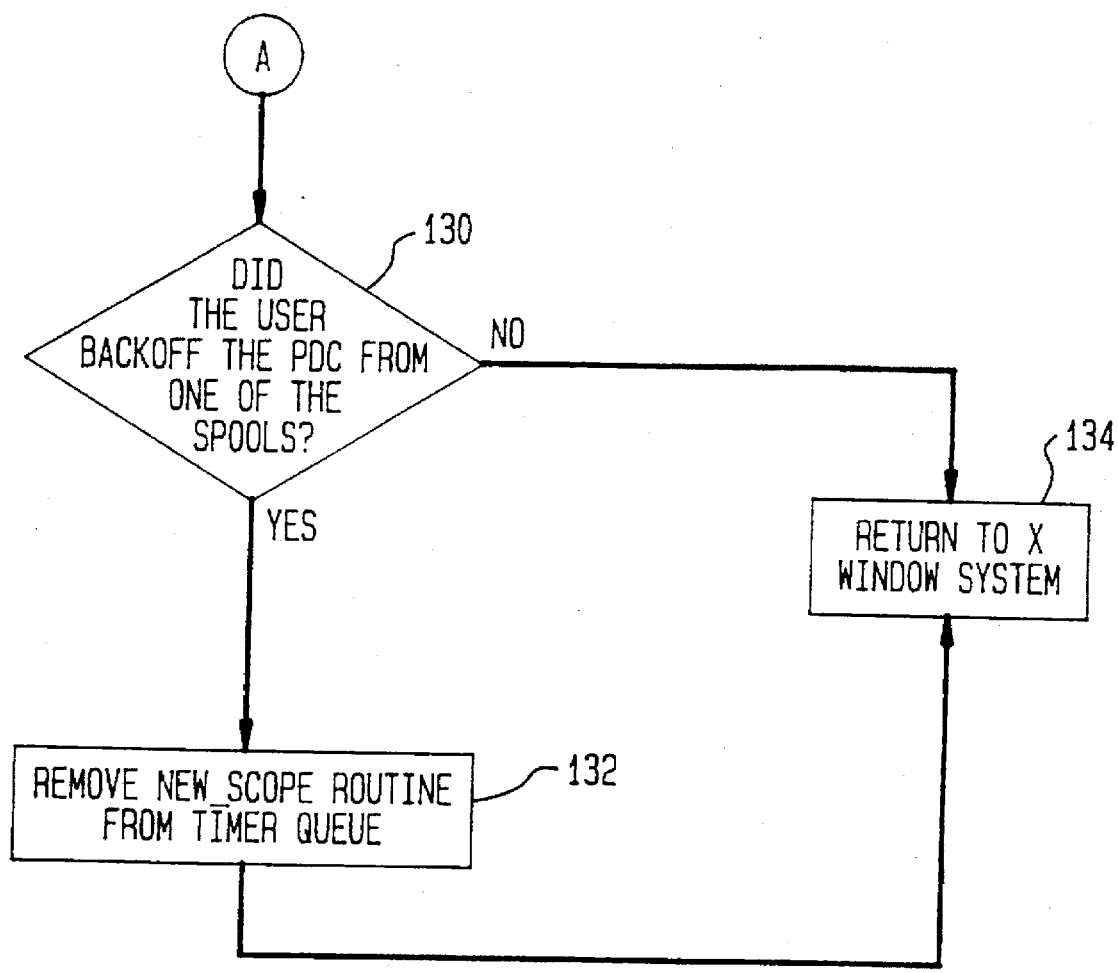

Reference is now made to FIGS. 7A–7B to describe the processing that occurs when a movement or drag event occurs. The flow chart of FIGS. 7A–7B represent the software module that is invoked by the X Window system upon receiving and processing a drag event. As indicated in FIG. 7A, the drag event is referred to as a "mouse button 1 drag event" which means that the X Window system has detected that the user has depressed mouse button 1 and the user is moving the mouse 60 which, in turn, is causing the pointing device cursor to move on the screen 56 of the user's workstation 52.

The process of a user positioning the pointing device cursor over the frame 40 or the handle 42 and depressing the mouse button 1 and then moving the pointing device cursor generates a mouse button 1 press event. A series of mouse button 1 drag events follow until the user stops moving the mouse 60 or there is no more information to be displayed. Depending on the speed at which the pointing device cursor is moved, a mouse button 1 drag event may be received for every pixel through which the pointing device cursor crosses over on the screen 56 until the user stops moving the mouse 60.

Upon entering the processing flow of FIG. 7A from the X Window system as a result of a mouse button 1 drag event, the X Window system passes the x,y coordinates of the pointing device cursor and a time stamp indicating the current time to this software module. In step 120, the module tests the Glass_Selected flag to determine if it is set to true. If it is indicating that the user is dragging the magnifying glass image 32, control passes to step 122 where a series of calculations are performed. The software module that performs these calculations is illustrated in FIG. 7C.

Figure 7C:
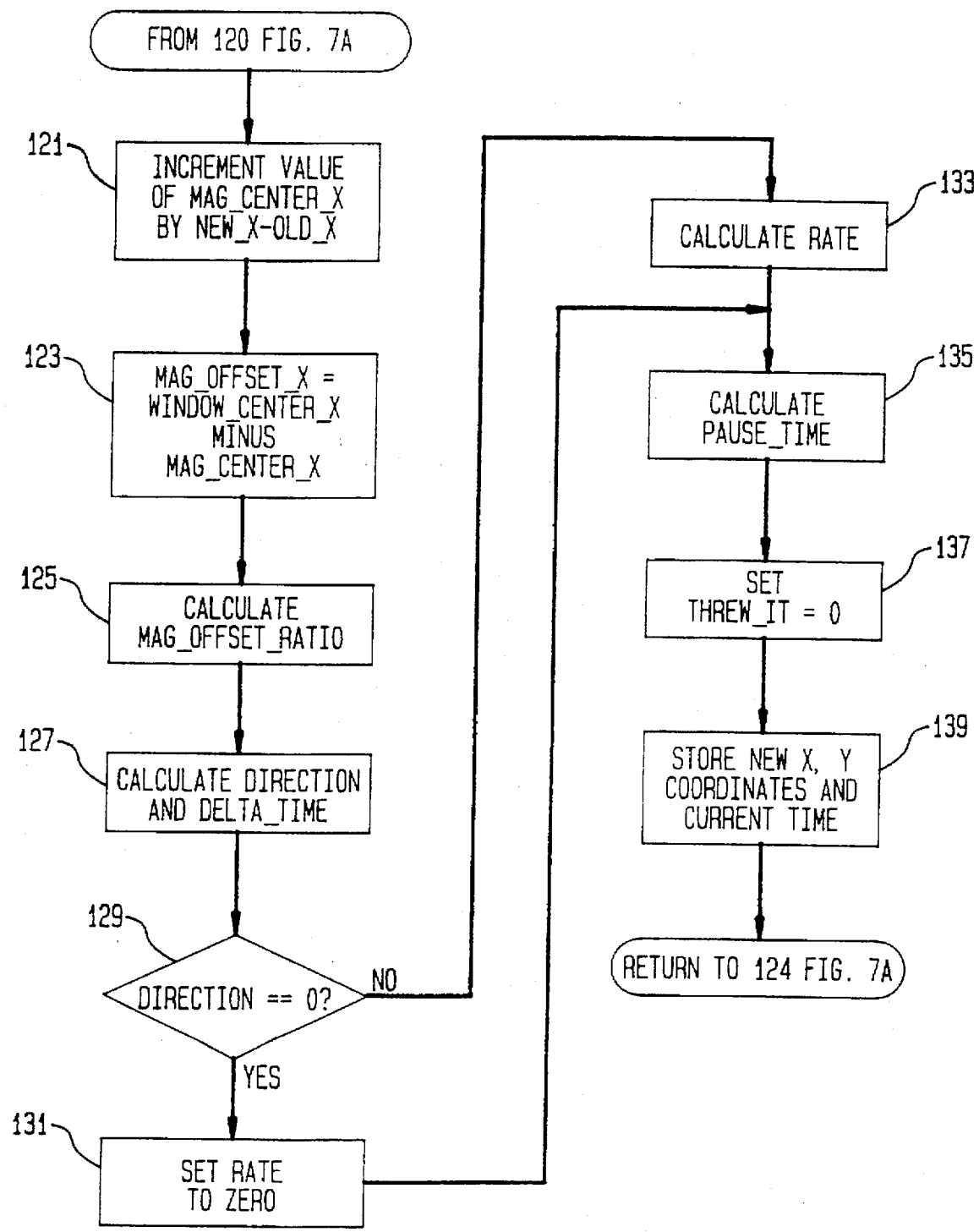

Reference is now made to FIG. 7C to describe the processing that occurs to perform the series of calculations to move the magnifying glass image 32 across the screen 56. The flow chart of FIG. 7C represents the software module that is invoked by step 122 of the software module of FIG. 7A to perform those calculations.

When it is determined in step 120 (FIG. 7A) that the Glass_Selected flag is set to true, control passes to step 122 (FIG. 7A) which, in turn, passes control to step of 121 of FIG. 7C. Upon entering the processing flow of FIG. 7C, a variable referred to as "mag_center_x" is incremented by the difference between the value stored in new_x and the value stored in old_x in step 121. This variable represents the x coordinate for the center point of the magnifying glass image 32 in a window on the screen 56. The variable mag_center_x is calculated for each drag event processed. The magnifying glass image 32 is then moved in the x direction to the appropriate spot based upon the value of this variable.

In step 123, a calculation is performed to measure the difference between the center of the magnifying glass image 32 from the center of the window in which the magnifying glass image 32 is displayed on the screen 56. The result of the calculation is stored in a variable "mag_offset_x." This calculation is performed by determining the difference between the value of a variable "window_center_x" which is representative of the center of the window currently displayed on the screen 56 and mag_center_x.

The variable mag_offset_x is then utilized in step 125 to determine if the user is attempting to move the magnifying glass image 32 outside of the currently displayed window. This variable is a measure of the relative "hardness" which represents how far, if at all, the magnifying glass image 32 is being pushed by the user into either the supply spool image 36 or the take-up spool image 34.

A ratio is then calculated in step 125 referred to as "mag_offset_ratio" by dividing mag_offset_x by a variable referred to as "mag_offset_x_max" which is a constant representative of the maximum distance a user can drag the magnifying glass image 32 within the currently displayed window on the screen 56. The result of this calculation is used later in step 135 to calculate the value of the variable "pause_time" and is discussed below.

In step 127, the direction of the movement of the magnifying glass image 32 via the pointing device cursor by the user is calculated. The direction is determined by calculating the difference between the x,y coordinates of the pointing device cursor passed by the X Window system for this drag event (represented by variables "new_x" and "new_y") and the x,y coordinates of the pointing device cursor passed by the X Window system for the last drag event processed (represented by variables "old_x" and "old_y"). Note that the direction of movement of the pointing device cursor cannot be determined if this is the first drag event. Also, a variable "delta_time" is calculated in step 127 by determining the difference between the value stored in a variable "current_time" which contains the time stamp representative of the current time passed by the X Window system indicating the time the current drag event was detected and the value of a variable referred to as "old_time" which contains the time stamp for the last X Window event processed.

Next, the speed of the movement of the magnifying glass image 32 via the pointing device cursor by the user is determined. This is accomplished by testing the variable direction to determine if it is equal to zero in step 129 indicating that the pointing device cursor has not been moved. If it is equal to zero, control is passed to step 131 where the value of a variable "rate" which is representative of the speed at which the pointing device cursor is being moved is set to zero. Control then passes to step 135.

Figure 8:
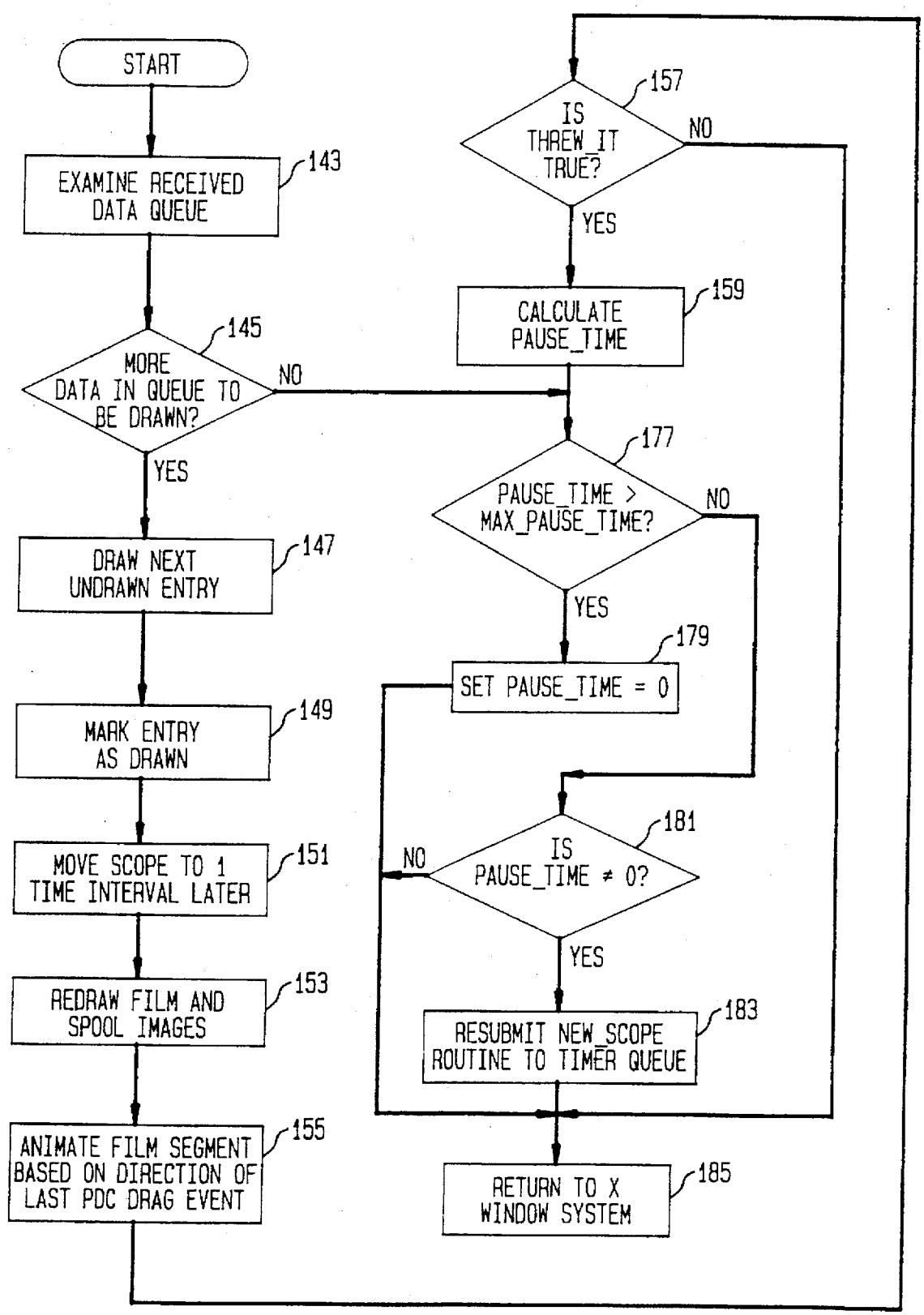
FIG. 8 illustrates the processing flow for redrawing the exemplary first interactive icon after the processing set forth in FIGS. 7A–7B is completed.

If it was determined in step 129 that direction is nonzero, control passes to step 133 to calculate the value for the variable rate. The value for rate is determined by dividing the value of the direction by the value of the variable delta_time. Control then passes to step 135 to calculate the value of a variable "pause_time" which is an interval utilized to start a timer for executing a routine called the "New_Scope" routine which is illustrated in FIG. 8 (discussed below). The New_Scope routine is the software module that adds new data to the data displayed on the screen 56.

The value of pause_time is calculated by multiplying the value of the variable mag_offset_ratio calculated in step 125 and a constant representative of a portion of the maximum speed that the magnifying glass image 32 can be moved and data can be displayed under the magnifying glass image 32. Then, a variable referred to as "threw_it" is set to zero in step 137 indicating that it has not been determined that the user has "thrown" the magnifying glass image 32 across the screen 56. The value of the variables new_x, new_y and current_time are then stored in the variables old_x, old_y and old_time, respectively. Control is then returned to step 124 of FIG. 7A.

Upon returning to the processing flow of FIG. 7A, the upper and lower ranges of the data to be displayed are set to be displayed in step 124. The data is then displayed conceptually under the frames 46a–46f (FIG. 3C) of the film 38 within the magnifying glass image 32 on the screen 56 in step 126. Next, step 128 is executed to determine if the pause_time is nonzero. If it is, control is passed to step 141 where the New_Scope routine (see FIG. 8) is placed in the timer queue. Processing continues in step 130 on FIG. 7B. If pause_time is equal to zero, the New_Scope routine (see FIG. 8) is not placed in the timer queue and control is passed back to the X Window system in step 142.

In step 130, it is determined if the drag event being processed is the result of the user moving the magnifying glass image 32 off either the supply spool image 36 or take-up spool image 34. If it is not, control is passed back to the X Window system in step 134. If it is, the New_Scope routine (see FIG. 8) is removed from the timer queue and then control is passed back to the X Window system in step 134. Thus, the processing of the drag event is completed.

If it is determined in step 120 that the Glass_Selected flag is not set true indicating that the user is not dragging the magnifying glass image 32, control passes to step 136. In this step, the tic_selected flag is tested to determine if it is set to true indicating the user is altering the time scale of the displayed data. If the tic_selected flag is not set, control is passed back to the X Window system in step 142. If the flag is set, control passes to step 138 where the distance from the current position of the pointing device cursor is measured from the center of the tic marks to calibrate the new time scale. In step 140, the current data display grid and the data is erased and redrawn to reflect either the expansion or contraction of the data displayed based upon the distance and direction of the tic drag. Control is then passed back to the X Window system in step 142.

Reference is now made to FIG. 8 to describe the processing of the New_Scope routine. As discussed above in connection with FIGS. 7A–7C, this routine is placed in a timer queue after certain conditions are met when processing a mouse button 1 drag event. This routine is invoked to dynamically redraw the data displayed under the frames under the magnifying glass image 32 based upon new information being stored in a received data queue which has not yet been displayed. The received data queue is essentially the memory 55 associated with the workstation 52. The received data queue is examined in steps 143 and 145 to determine if there is more data in the queue than what has already been drawn. If there is no more data in the data queue, control is then passed to step 183 where the New_Scope routine is resubmitted to the timer queue and then control is passed back to the X Window system in step 185. If there is, the next entry in the received data queue is drawn in step 147. The entry which has just been drawn is marked as drawn in step 149 and then the scope of interest which is the area underneath the magnifying glass image on the screen 56 of the workstation 52 is adjusted to represent one time interval later in step 151. This time interval is determined by the drag speed, the width of the time axis and the value assigned to a friction constant between zero and one so that movement of the film 38 will be slowed. Next, the interactive icon is redrawn by first redrawing the data images on the film 38 and then redrawing the supply spool image 36 and the take-up spool image 36 in step 153. Animation of the film 38 movement on the screen is then performed in step 155 based on the direction of the last drag event.

The variable threw_it is tested in step 157 to determine if the user has thrown the pointing device cursor towards either the supply spool image 36 or the take-up spool image 36. If it is determined in step 157 that the user has not thrown the pointing device cursor, control is then passed back to the X Window system in step 185. If the user has thrown the pointing device cursor, a new value for pause_time is computed by first multiplying the current value stored in a variable "velocity" (calculated in FIG. 10A and discussed below) by the selected friction constant in step 159. After this initial calculation is made, the product is stored in the variavble velocity in step 159. Then the maximum allowable velocity which is a constant referred to as "Max_Rate" that is representative of the maximum speed at which images can be drawn on the screen 56 is divided by the new value for velocity in step 159 to determine the new value for pause_time.

The value for pause_time is then tested to determine if it is greater than a preselected constant referred to as "max_pause_time" which is defined as the largest time interval where no more significant motion is detected in step 177. If it is, pause_time is set to zero in step 179 and then control is passed back to the X Window system in step 185. If it is determined in step 177 that the value for pause_time is not greater than the max_pause_time, control passes to step 181 to determine if pause_time is nonzero. If it is, the New_Scope routine is resubmitted to the timer queue in step 183 and then control is passed back to the X Window system in step 185. If pause_time is zero, control passes back to the X Window system in step 185.

Figure 9:
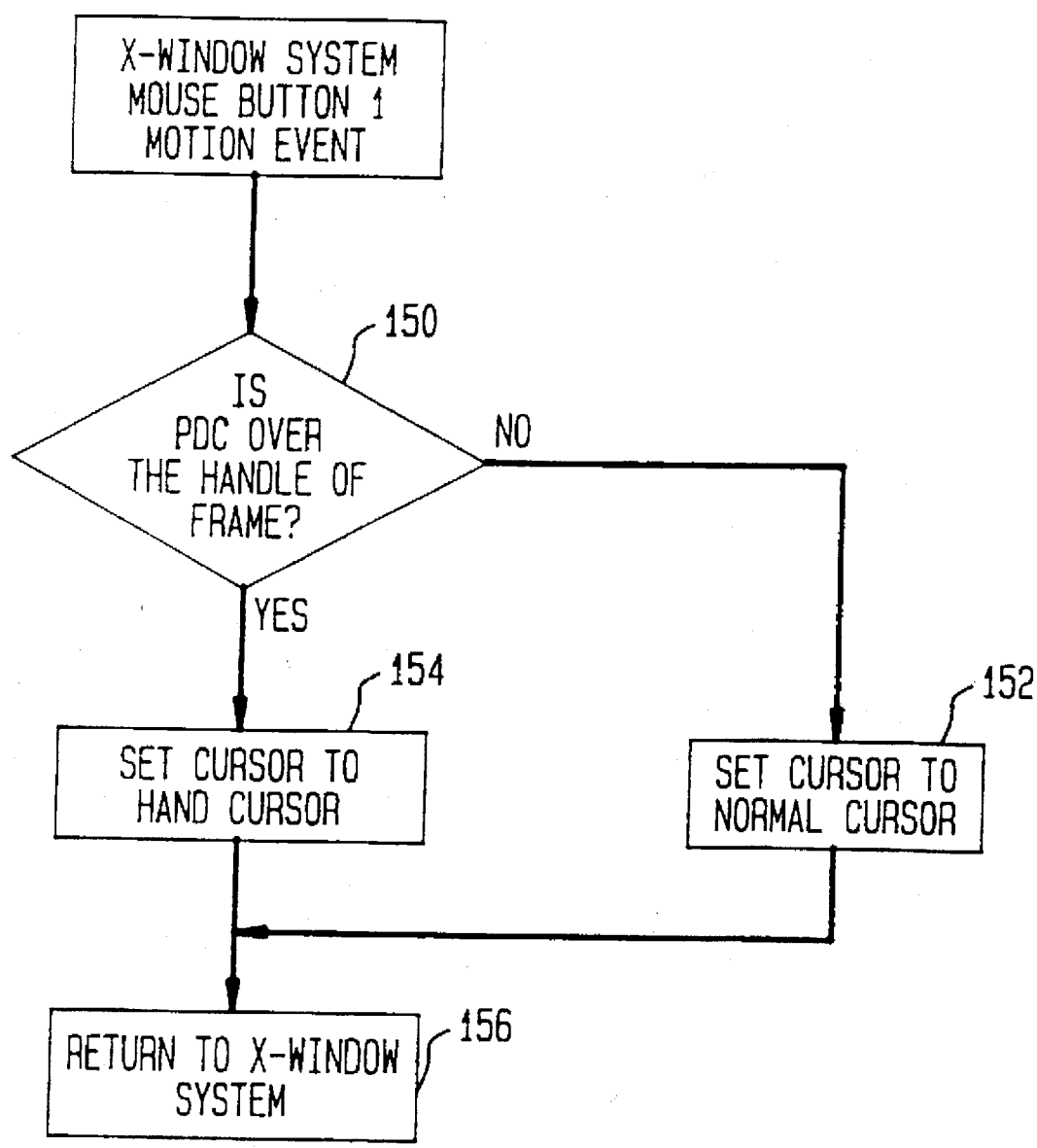
FIG. 9 illustrates the processing flow for user-initiated action for moving a portion of the exemplary first interactive icon utilized in the user interface of the present invention.

Reference is now made to FIG. 9 to describe the processing of X Window System Mouse Button Motion 1 Event. Upon entering the flow, the x,y coordinates passed to the module from the X Window system which represent the current position of the pointing device cursor are tested in step to determine if it is over the handle 40 or the border 42. If it is not, the cursor displayed on the screen 56 is not changed in step 152 and control passes back to the X Window system in step 156. If the pointing device cursor is over the handle 40 or the border 42, the cursor displayed on the screen 56 is converted to grabber hand cursor in step 154. Control is then passed back to the X Window system in step 156.

Figure 10A:
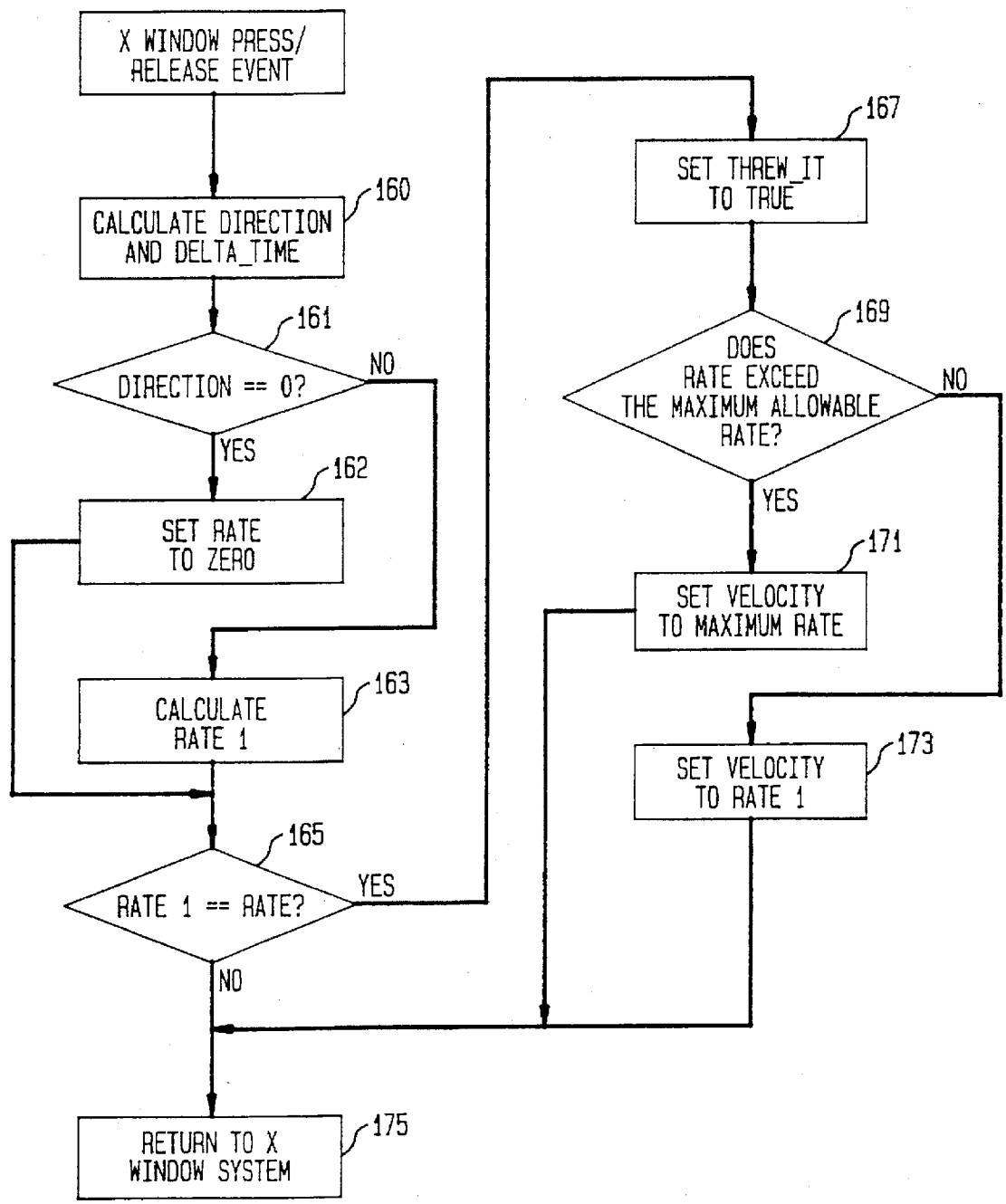
FIGS. 10A–10B illustrate the processing flow user-initiated action for terminating the processing of movement of a portion of the, exemplary first interactive icon utilized in the user interface of the present invention.

Reference is now made to FIG. 10A to describe the processing of X Window System Mouse Button 1 Press/Release Event which occurs when a user "clicks" mouse button 1. Upon entering the processing flow, the X Window system passes the x,y coordinates of the pointing device cursor and a time stamp indicating the current time to this software module. Values for the variables direction and delta time are calculated in step 160 using the same techniques discussed above in connection with step 127 of FIG. 7C. Next, the speed of the movement of the magnifying glass image 32 via the pointing device cursor by the user is determined. This is accomplished by testing the variable direction to determine if it is equal to zero in step 161 indicating that the pointing device cursor has hot been moved. If it is equal to zero, control is passed to step 162 where the value of rate is set to zero. Control then passes to step 165.

If it was determined in step 161 that direction is nonzero, control passes to step 163 to calculate the value for a variable "rate1" which is representative of the current rate at which the pointing device cursor is being moved. The value for rate1 is determined by dividing the value of the variable direction by the value of the variable delta_time.

Next, control is passed to step 165 where it is determined if the value of the variable rate1 is equal to the value of the variable rate which was calculated in step 133 of FIG. 7C. If the variables are not equal, control is passed back to the X Window system in step 175. If the variables are equal indicating that the user has thrown the pointing device cursor, the variable threw_it is set true in step 167. Then, rate is tested against the constant "Max_Rate" to determine if it is greater than the maximum allowable rate at which images can be drawn on the screen 56. If it is, the variable "velocity" is set equal to the Max_Rate constant in step 171 and then control is passed back to the X Window system in step 175.

If it is determined in step 169 that the rate does not exceed the maximum allowable rate, control is passed to step 173 where the variable velocity is set equal to the value of the variable rate1. Control is then passed back to the X Window system in step 175.

Figure 10B:
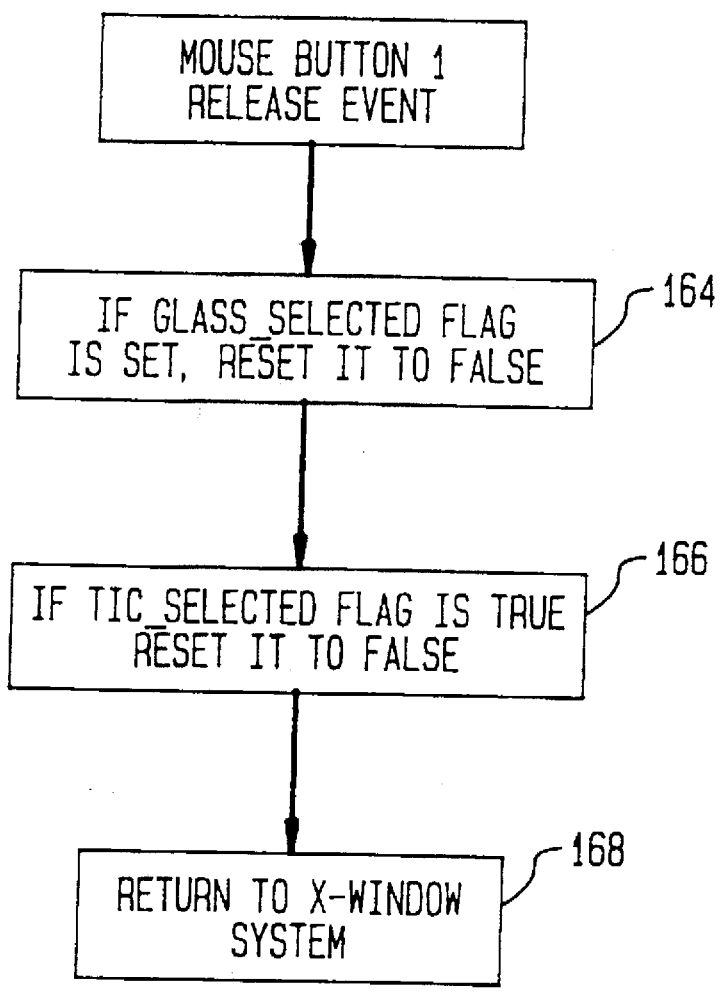

Reference is now made to FIG. 10B to describe the processing of X Window System Mouse Button 1 Release Event which occurs when a user releases mouse button 1. Upon entering the flow, the Glass_Selected flag is set to false if it was true in step 164. Next, the tic_selected flag is also set to false if it was set to true in step 166. Control is then passed back to the X Window system in step 168.

Figure 11A:
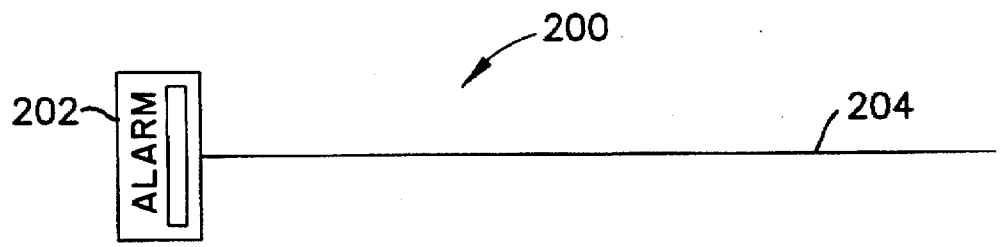
FIG. 11A illustrates an exemplary second interactive icon utilized in the user interface of the present invention.

The user interface of the present invention further provides a second interactive icon which allows a user to set a range of values in relationship to graphically presented data. Referring now to FIG. 11A, there is illustrated a second exemplary interactive icon utilized in the user interface of the present invention. The second interactive icon 200 includes a directly manipulatable slider 202 along a first axis, for example, a vertical axis, of graphically displayed data (not shown) and an indicator bar 204 along a second axis, for example, a horizontal axis, of the graphically displayed data. The slider 202 may contain a textual indication of its purpose, e.g., an alarm value.

Figure 11B:
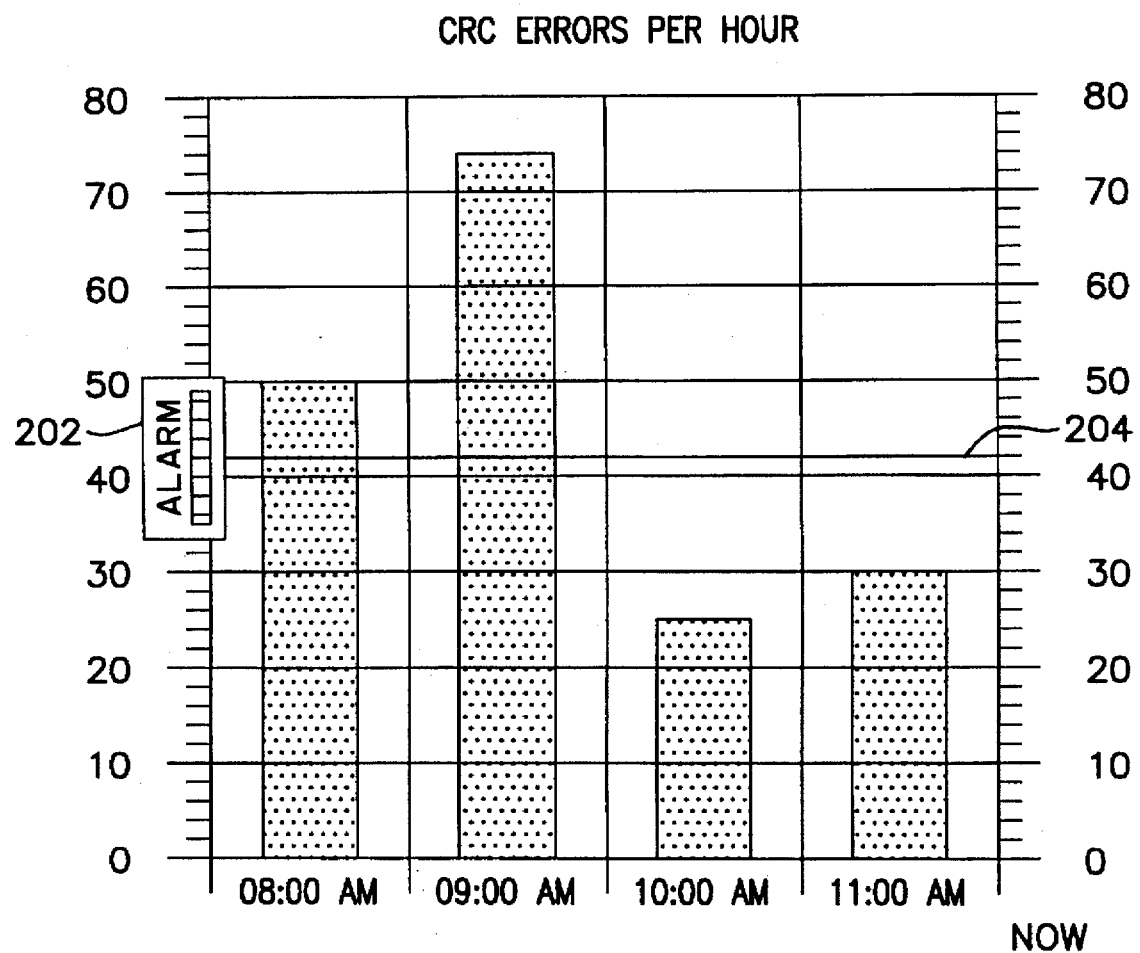
FIG. 11B illustrates the exemplary second interactive icon utilized in the user interface of the present invention as it would appear on a computer screen overlaid on an example of graphical displayed data.

When the indicator bar 204 is in its default condition of supplying a single crossing threshold, it is represented by a thin line and would appear on the screen of a display device, e.g., the screen of a user's work station as illustrated in FIG. 11A. FIG. 11B illustrates the second interactive icon 200 overlaid on an example graphic display of data, set to take action, e.g., sound an alarm when more than 42 CRC errors per hour occur and cease alarming when less than 42 CRC errors per hour occur, as indicated in optional text boxes 206 and 208, respectively.

Figure 11C:
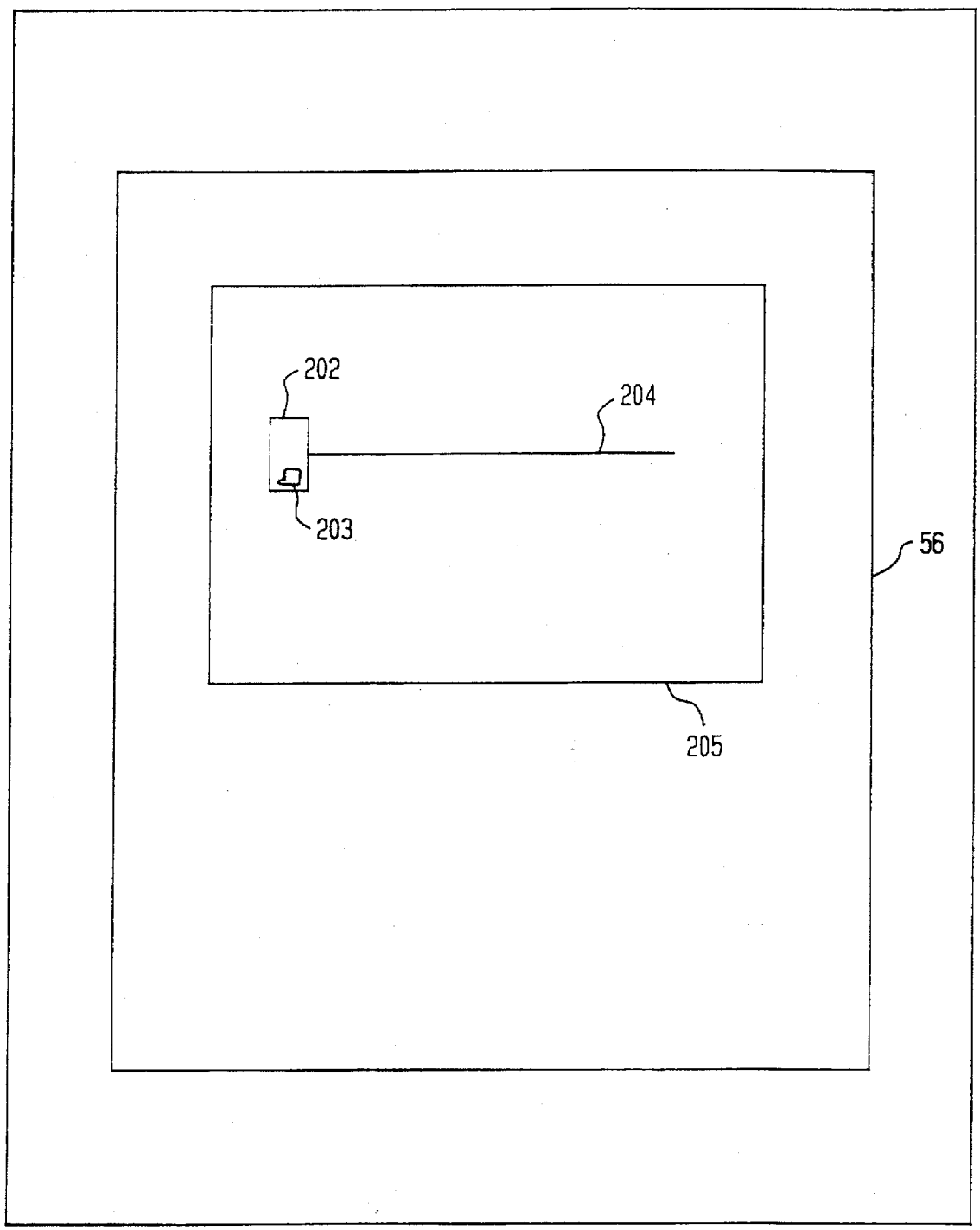
FIG. 11C illustrates the exemplary second interactive icon utilized in the user interface of the present invention with a pointing device cursor illustrated as a grabber hand.

The user can "grab" the second interactive icon 200 by its slider 202 using a pointing device by positioning the pointing device cursor over the slider 202. The user can then drag the slider 202 up and down the vertical axis or y-axis to change its setting (and the values in the optional text boxes change accordingly). The pointing device cursor changes to a "grabber hand" 203 whenever the cursor is over the slider 202 to give an indication that it can be moved as illustrated in a window 205 in FIG. 11C.

The user interface of the present invention also allows the user to expand the value of the second interactive icon 200 into a range of values so that there is a range, or hysteresis, between the point at which some activity may take place and the point at which that activity is canceled. In the manner of direct manipulation, the user can either directly modify the values in the text boxes by selecting and typing, or using their up/down arrows, and also directly manipulate the second interactive icon itself.

Figure 12A:
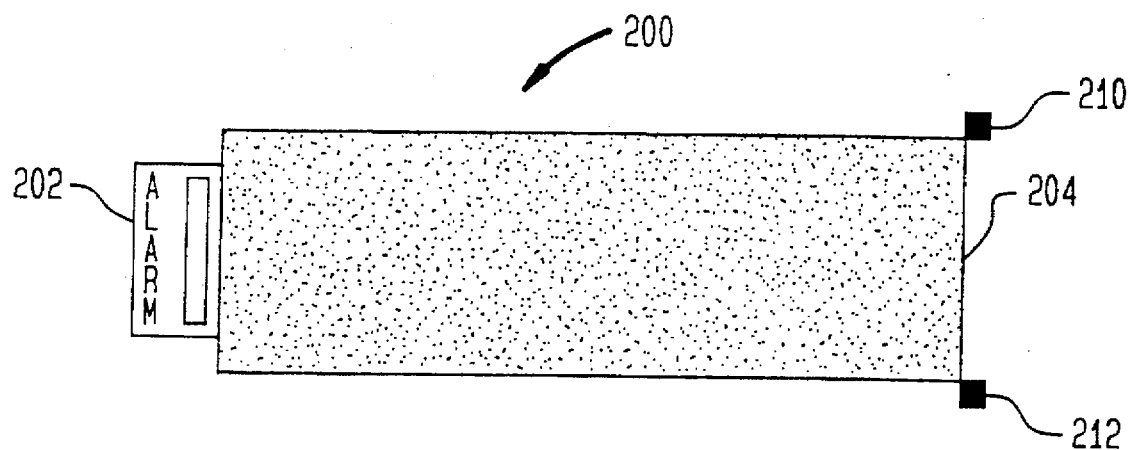
FIG. 12A illustrates the exemplary second interactive icon utilized in the user interface of the present invention in an expanded state with handles portions of the exemplary second interactive icon associated therewith.

Once the second interactive icon 200 is selected to be displayed on the screen of a user's work station, it is displayed in its single-value state as illustrated in FIG. 11A. As illustrated in FIG. 12A, two small objects, e.g., squares 210 and 212, illustrated above and below the right side of the indicator bar 204, are hereinafter referred to as handles 210 and 212. The user can drag the upper handle 210 upwards and/or the lower handle 212 downwards to directly expand the range of values based on the scale of the underlying data. The values in the optional text boxes 206 and 208 change in real time as the dragging occurs to provide detailed feedback to the user. As the transparent indicator bar 204 expands, the slider 202 moves to remain centered within the width of the indicator bar 204 as illustrated in FIG. 12A.

Figure 12B:
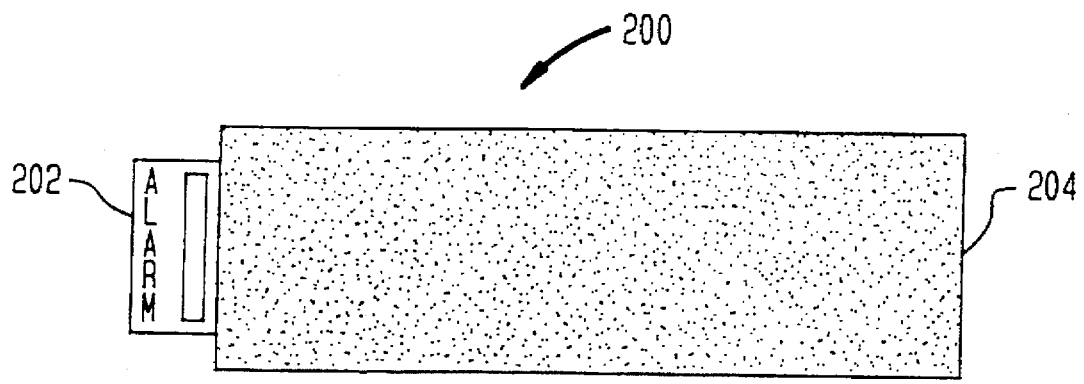
FIG. 12B illustrates the exemplary second interactive icon utilized in the user interface of the present invention in an expanded state without handles portions of the exemplary second interactive icon.

When the user positions the pointing device cursor over an object displayed on the screen other than the second interactive icon 200, the second interactive icon 200 reverts to its unselected state and the handles 202 and 212 disappear as illustrated in FIG. 12B. The user can always reselect the second interactive icon 200 at any time which causes its handles 210 and 212 to appear to change the width of the range as needed.

Figure 13A:
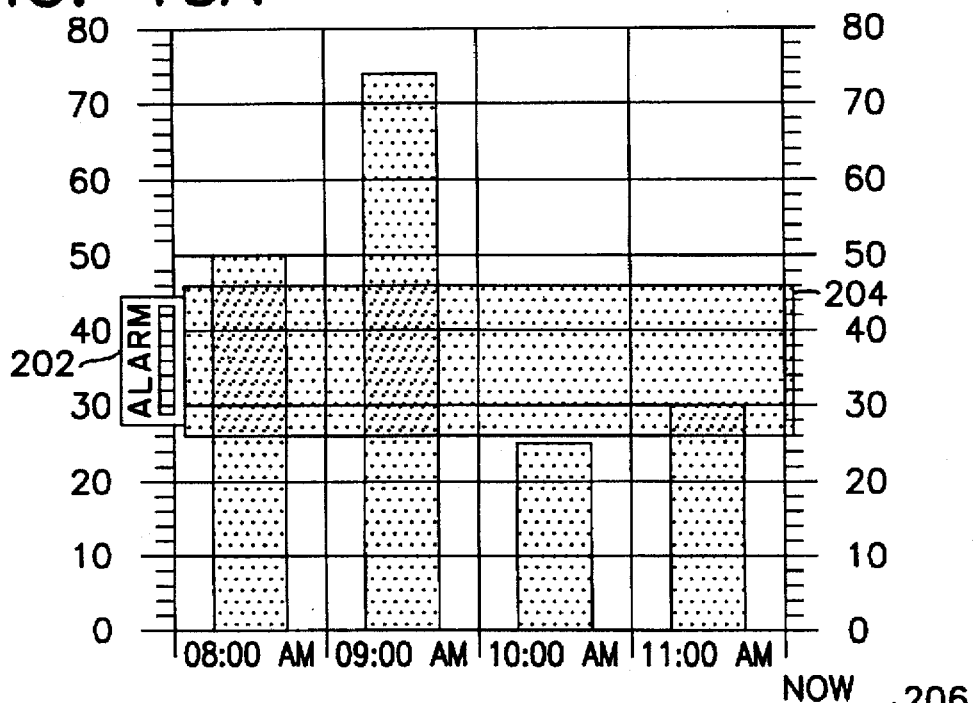
FIG. 13A illustrates the exemplary second interactive icon utilized in the user interface of the present invention in an expanded state overlaid on a first example of graphical displayed data.

The second exemplary interactive icon 200 is illustrated in its expanded state on the underlying graph in FIG. 13A.

Figure 13B:
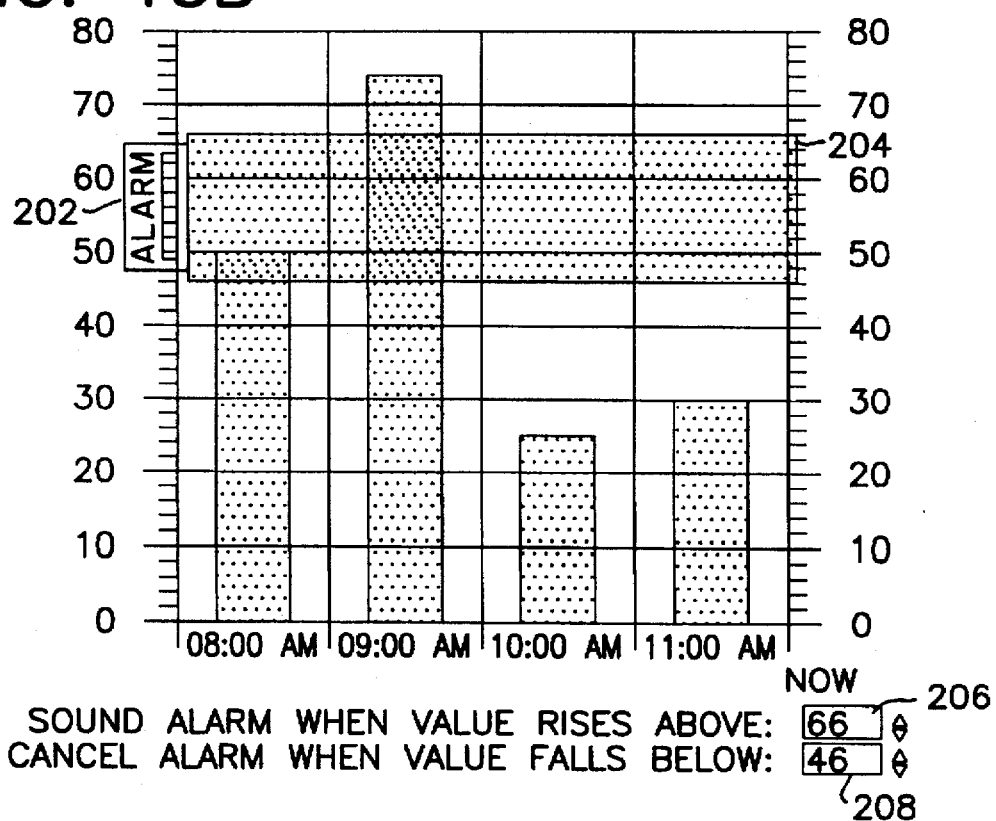
FIG. 13B illustrates the exemplary second interactive icon utilized in the user interface of the present invention in an expanded state overlaid on the first example of graphical displayed data.

Whatever the width of the second interactive icon 200, the user can move the range of values along the y-axis by dragging the slider 202 of the second interactive icon 200 to thereby change the values but not the width of the range as illustrated in FIG. 13B. Dragging the slider 202 of the second interactive icon 200 into the top or bottom of the underlying graphic display of data causes the scale of the underlying data to expand or contract so that any value can be set.

To describe how the second interactive icon 200 is displayed and utilized by the user and the resulting processing that occurs by the X Window system and associated software, reference is now made to FIG. 14. The second interactive icon of the present invention of FIG. 11A is reproduced over an x,y coordinate system in FIG. 14. For the purposes of this description, the second interactive icon of FIG. 11A illustrated in FIG. 14 is hereinafter referred to as a "high-water" bar 230 because it is utilized to indicate a threshold value. The high-water bar 230 is superimposed over an x,y coordinate system. The high-water bar 230 comprises a high-water vertical bar 232 (corresponding to the slider 202 of FIG. 11A), represented by the variable name "HWV", and a high-water horizontal bar 234 (corresponding to the indicator bar 204 of FIG. 11A), represented by the variable name "HWH". The high-water horizontal bar 234 is arranged horizontally on the screen whereas the high-water vertical bar 232 is arranged vertically on the y axis of the x,y coordinate system.

The initialized positions of the high-water vertical bar 232 and the high-water horizontal bar 234 are defined by a plurality of coordinates which identify the position of the bars on the screen. As illustrated in FIG. 14, the position of the high-water vertical bar 232 is defined by coordinates HWV_UL_X,Y 236, HWV_LL_X,Y 238, HWV_UR_X,Y 240 and HWV_LR_X,Y 242, which define the upper left, lower left, upper right and lower right x,y coordinates of the high-water vertical bar 232, respectively. The position of the high-water horizontal bar 234 is defined by two objects referred to as "handles" 244 and 246 which are illustrated as squares above and below the high-water horizontal bar 234. The position of upper handle 244 is defined by coordinates RU_UL_X,Y 248, RU_LL,X,Y 250, RU_UR_X,Y 252 and RU_LR,X,Y 254, which define the upper left, lower left, upper right and lower right x,y coordinates of the upper handle 244, respectively. The position of lower handle 246 is defined by coordinates RL_UL_X,Y 256, RL_LL,X,Y 258, RL_UR_X,Y 260 and RL_LR,X,Y 262, which define the upper left, lower left, upper right and lower right x,y coordinates of the lower handle 246, respectively. These coordinates are stored in the memory 55 (FIG. 5) to enable the system to determine when the pointing device cursor is over one of the components of the high-water bar 230.

The foregoing initialized position of the high-water bar 230 illustrated in FIG. 14 is typically not displayed on the screen 36 (FIG. 5) of a user's work station 52 until the user desires to use it. When such time occurs, the user will select the high-water bar 230 to be displayed, e.g., through a menu selection process, which will cause the high-water bar to be displayed over a graphical representation of data that the user is viewing.

When the user wants to utilize the second interactive icon of the present invention, the first step the user performs is to display data in graphical form. As discussed above in connection with the first interactive icon, before the second interactive icon appears on the screen 56 (FIG. 5), the user selects an option from a menu to display the data, e.g., the user pulls down a menu by positioning the pointing device cursor over a menu box displayed on the screen 56 and selects the option to graph data of interest, e.g., the traffic on a network, by depressing or clicking a button on the pointing device. This will cause a graphical representation of the desired data to be displayed on the screen 56. The data depicted in the graph can be real-time data or data that was stored in the memory 55 (FIG. 5). When the user decides to set a threshold on some of the data, i.e., when some of the data goes above a certain point the user wants a certain action to take place, the user enables the high-water bar 230, e.g., by selecting another option on a menu. This will cause the high-water bar 230 of FIG. 13 to be displayed on the screen 36 overlaid on top of the graphical data (not shown) already being displayed on the screen 36. The high-water bar 230 will then appear at its initialized position over the graph.

Figure 15:
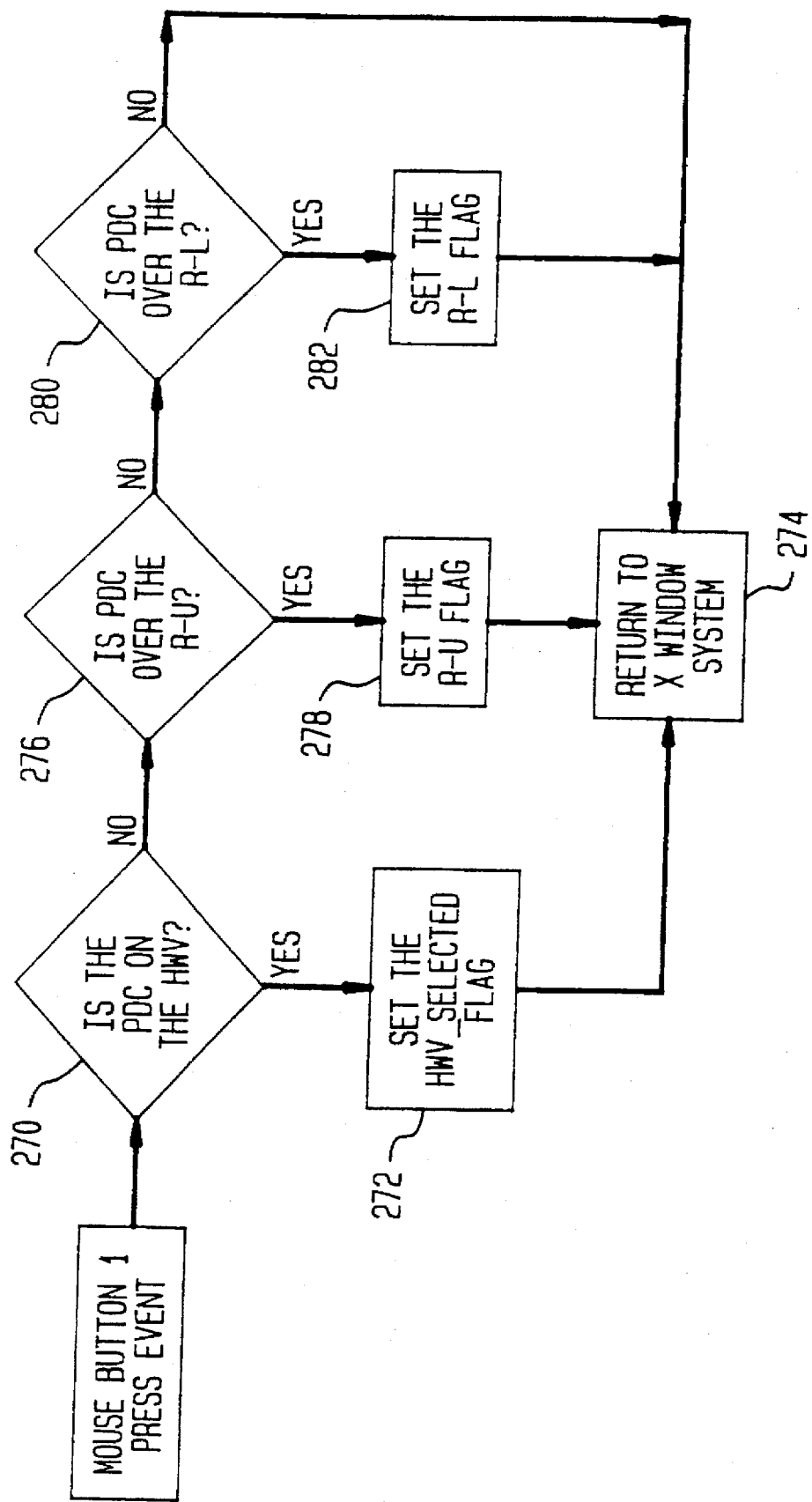
FIG. 15 illustrates the processing flow for user-initiated action for changing the position of the exemplary second interactive icon utilized in the user interface of the present invention.

Referring now to FIG. 15, there is illustrated the processing flow for user-initiated action on the user's work station 52 (FIG. 5) for changing the position of the high-water bar 230 illustrated in FIG. 14. As discussed above, the user by using the mouse 60 (illustrated in FIG. 5) can move the high-water bar 230 in either vertical direction. Through such movement, the high-water bar 230 can represent one threshold value, an upper or lower threshold value, or a threshold region.

Reference is now made to FIGS. 5, 14 and 15 to describe the processing that occurs when a user enables the pointing device 60, e.g., depresses the button 62 on the mouse 60. At the moment the pointing device 60 is enabled, the X Window system ascertains the x,y coordinates which represent the position of the pointing device cursor at that time. The enabling of the pointing device 60 is an asynchronous event labeled in FIG. 15 as "mouse button 1 press event". Mouse button 1 is chosen for this example to be the button on the mouse which indicates a user selection. This event is processed by the X Window system which, in turn, transfers processing to the flow illustrated in FIG. 15.

When the X Window system transfers processing to the software module represented by the flow chart in FIG. 15, it passes the x,y coordinates of the pointing device cursor to this software module. As indicated in step 270, the module determines if the x,y coordinates of the pointing device cursor passed from the X Window system are within the range of coordinates which define the present position of the high-water vertical bar 232, i.e., HWV_UL X,Y 236, HWV_LL X,Y 238, HWV_UR X,Y 240 and HWV_LR_ X,Y 242. If they are, control passes to step 272 where a flag referred to as "hwv_selected" is set to allow further processing to occur when an X Window event indicating that the pointing device cursor is being dragged, i.e., moved. Control is then passed back to the X Window system to process the next event as indicated in step 274.

If the pointing device cursor is not within the range of coordinates which define the present position of the high-water vertical bar 232, control is passed to step 276 to determine if the x,y coordinates of the pointing device cursor passed from the X Window system are within the range of coordinates which define the present position of the upper handle 244, i.e., RU_UL_X,Y 248, RU_LL,X,Y 250, RU_UR X,Y 252 and RU_LR,X,Y 254. If they are, control passes to step 278 where a flag referred to as "ru_selected" is set to allow further processing to occur when an X Window event indicating that the pointing device cursor is being dragged. Control is then passed back to the X Window system to process the next event as indicated in step 274.

If it is determined in step 276 that the pointing device cursor is not within the range of coordinates which define the present position of the upper handle 244, control is passed to step 280 to determine if the x,y coordinates of the pointing device cursor passed from the X Window system are within the range of coordinates which define the present position of the lower handle 246, i.e., RL_UL_X,Y 256, RL_LL,X,Y 258, RL_UR X,Y 260 and RL_LR,X,Y 262. If they are, control passes to step 282 where a flag referred to as "rl_selected" is set to allow further processing to occur when an X Window event indicating that the pointing device cursor is being dragged.

Control is then passed back to the X Window system to process the next event as indicated in step 274. If it is determined in step 280 that the pointing device cursor is not within the range of coordinates which define the present position of the lower handle 246, control is passed to the X Window system to process the next event in step 274.

Figure 16A:
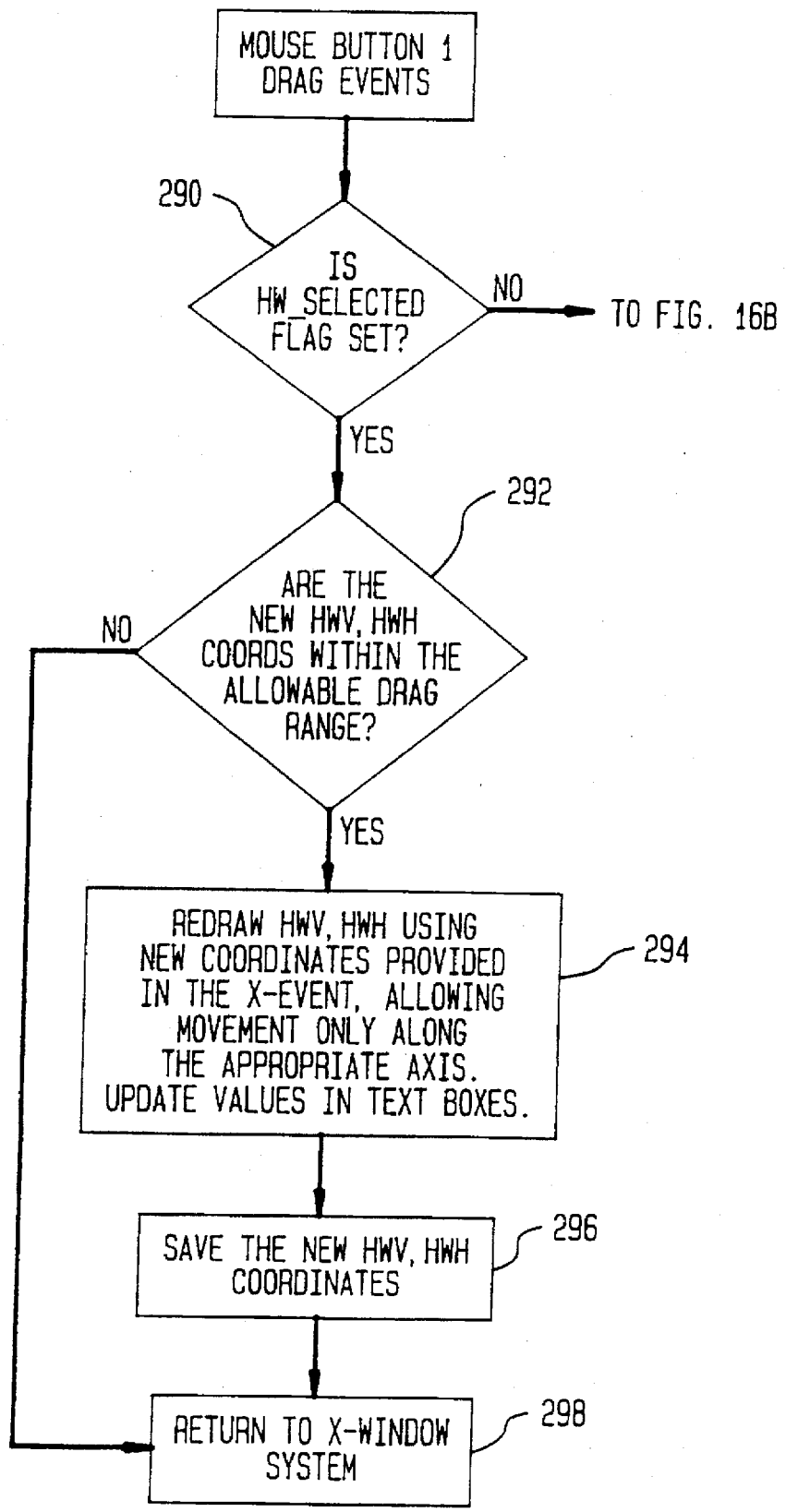
FIGS. 16A–16B illustrate the processing flow for user-initiated action for dragging the exemplary second interactive icon utilized in the user interface of the present invention.
Figure 16B:
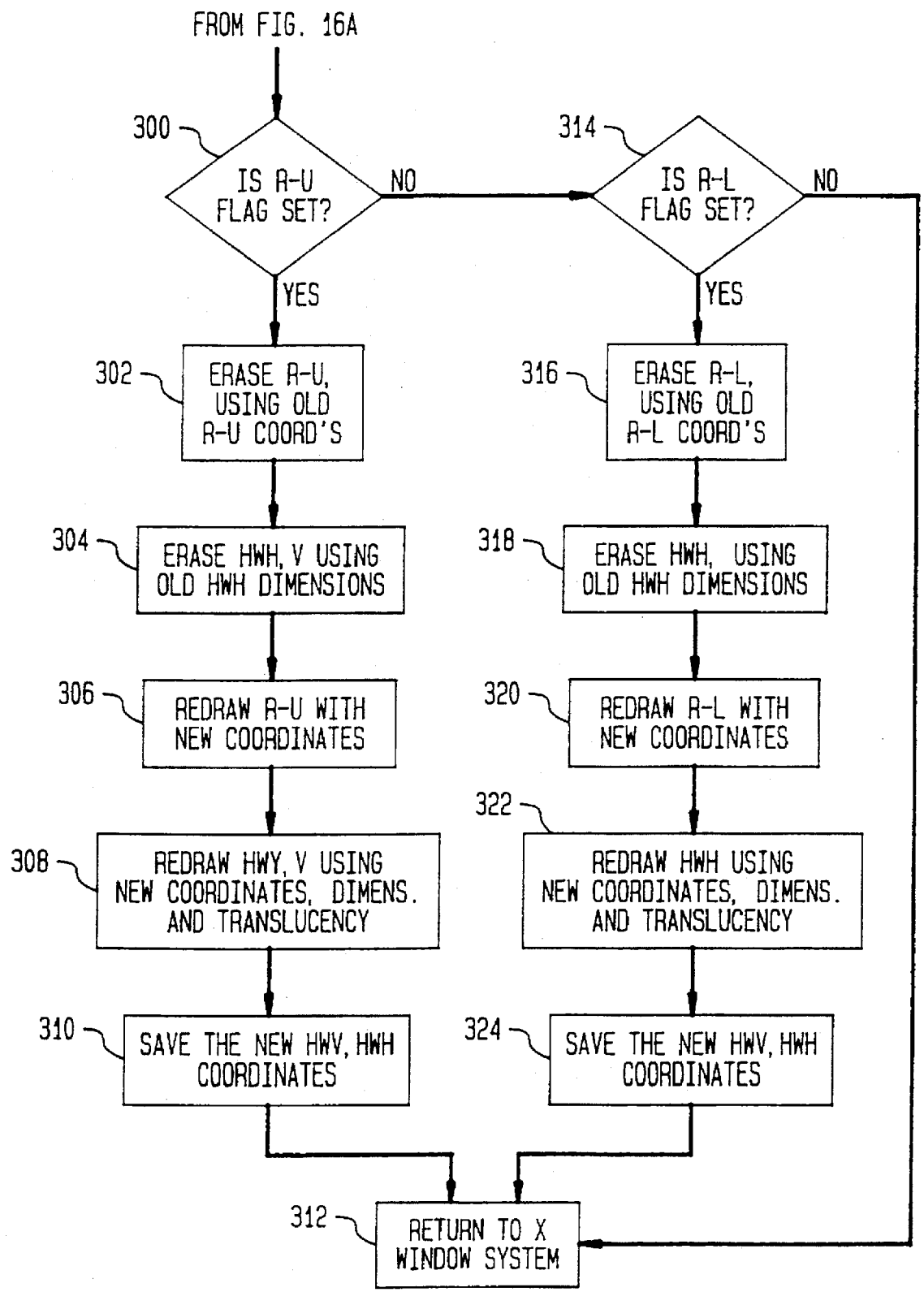

Reference is now made to FIGS. 16A–16B to describe the processing that occurs when a movement or drag event occurs. The flow chart of FIGS. 16A–16B represent the software module that is invoked by the X Window system upon receiving and processing a drag event. As indicated in FIG. 16A, the drag event is referred to as a "mouse button 1 drag event."

The process of a user positioning the pointing device cursor over the vertical bar and depressing the mouse button 1 and then moving the pointing device cursor generates a mouse button 1 press event. A series of mouse button 1 drag events follow until the user either stops moving the mouse 60 or moves the cursor beyond the range of the x,y coordinate system of the high-water bar 230. Depending on the speed at which the pointing device cursor is moved, a mouse button 1 drag event may be received for every pixel through which the pointing device cursor crosses over on the screen 56 until the user stops moving the mouse 60.

Upon entering the processing flow of FIG. 16A from the X Window system as a result of a mouse button 1 drag event, the hwv_selected flag is tested to determine if it is set in step 290. If the hwv_selected flag is set indicating that the user is dragging the high-water vertical bar 232, step 292 is executed to determine if the x,y coordinates of the pointing device cursor are within the allowable drag range which is defined by the axis on which the high-water vertical bar 232 moves. If it is not, control passes back to the X-Window system in step 298. If the pointing device cursor is within the allowable drag range, step 294 is executed to redraw the new high-water vertical and horizontal bars 232 and 234 using the x,y coordinates passed to this module by the X Window system which define the present position of the pointing device cursor at the time the mouse button 1 drag event occurred and update the values in the text boxes 206 and 208 on the screen 56 of the user's work station 52. The new coordinates which define the present position of the high-water horizontal and vertical bars 232 and 234 are saved in the variables HWV_UL X,Y 56, HWV_LL X,Y 58, HWV_UR X,Y 60 and HWV_LR X,Y 62 for the high-water vertical bar and in the variables RU_UL_X,Y 68, RU_LL,X,Y 70, RU_UR_X,Y 72, RU_LR,X,Y 74, RL_UL_X,Y 76, RL_LL,X,Y 78, RL_UR_X,Y 80 and RL_LR,X,Y 82, for the upper and lower handles 244 and 246 of the high-water horizontal bar 234, respectively in step 296. Control is then passed back to the X Window system as indicated in step 298.

If it is determined in step 290 that the hwv_selected flag is not set, control is passed to the software module represented by the flow chart in FIG. 16B. Referring now to FIG. 16B, upon entering the processing flow, the module determines in step 300 to determine if the ru_selected flag is set thereby indicating that the mouse button 1 drag event is the result of the user moving the upper handle 244 to change the width of the high-water horizontal bar 234. If the ru_selected flag is set indicating that the user is dragging the upper handle 244, step 302 is executed to erase the current upper handle 244 coordinates. Next, step 304 is executed to erase the current high-water vertical and horizontal bars 232 and 234 using the old high-water bar coordinates stored in their respective variables. The upper handle 244 is redrawn in step 306 utilizing the x,y coordinates passed to this module by the X Window system which define the present position of the pointing device cursor at the time the mouse button 1 drag event occurred. The new high-water vertical and horizontal bars 232 and 234 are drawn as indicated in step 308, using the coordinates of the upper and lower handles 64 and 66 and by centering the high-water vertical bar 232 over the high-water horizontal bar 234. The new coordinates which define the present position of the high-water horizontal and vertical bars 52 and 54 are saved in their respective variables in step 310. Control is then passed back to the X Window system as indicated in step 312.

If it is determined in step 300 that the ru_selected flag is not set, control is passed to step 314 to determine if the rl_selected flag is set thereby indicating that the mouse button 1 drag event is the result of the user moving the lower handle 246 to change the width of the high-water horizontal bar 234. If it is determined that the rl_selected flag is not set, control is passed back to the X Window system as indicated in step 312. If the rl_selected flag is set indicating that the user is dragging the lower handle 246, step 316 is executed to erase the current lower handle 246 coordinates. Next, step 318 is executed to erase the current high-water vertical and horizontal bars 232 and 234 using the old high-water bar 230 coordinates stored in their respective variables. The lower handle 246 is redrawn in step 320 utilizing the x,y coordinates passed to this module by the X Window system which define the present position of the pointing device cursor at the time the mouse button 1 drag event occurred. The new high-water vertical and horizontal bars 232 and 234 are drawn as indicated in step 322, using the coordinates of the upper and lower handles 244 and 246 and by centering the high-water vertical bar 232 over the high-water horizontal bar 234. The new coordinates which define the present position of the high-water horizontal and vertical bars 232 and 234 are saved in their respective variables in step 324. Control is then passed back to the X Window system as indicated in step 312.

Figure 17:
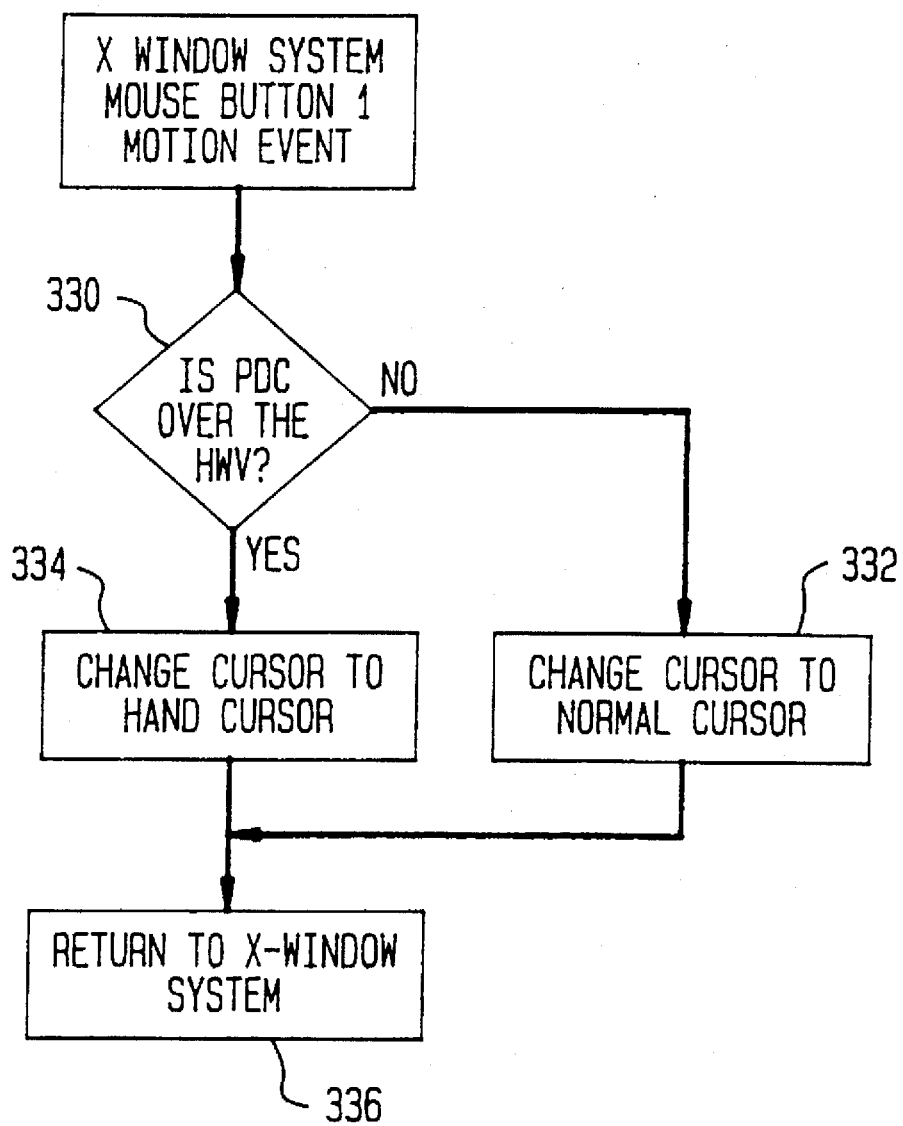
FIG. 17 illustrates the processing flow for user-initiated action for moving a portion of the exemplary second interactive icon utilized in the user interface of the present invention.

Reference is now made to FIG. 17 to describe the processing of X Window System Mouse Button Motion 1 Event. Upon entering the flow, the x,y coordinates passed to the module from the X Window system which represent the current position of the pointing device cursor are tested in step 330 to determine if it is over the high water vertical bar 232. If it is not, the dursor displayed on the screen 56 is not changed in step 332 and control passes back to the X Window system in step 336. If the pointing device cursor is over the high water vertical bar 232, the cursor displayed on the screen 56 is converted to grabber hand cursor in step 334. Control is then passed back to the X Window system in step 336.

Figure 18:
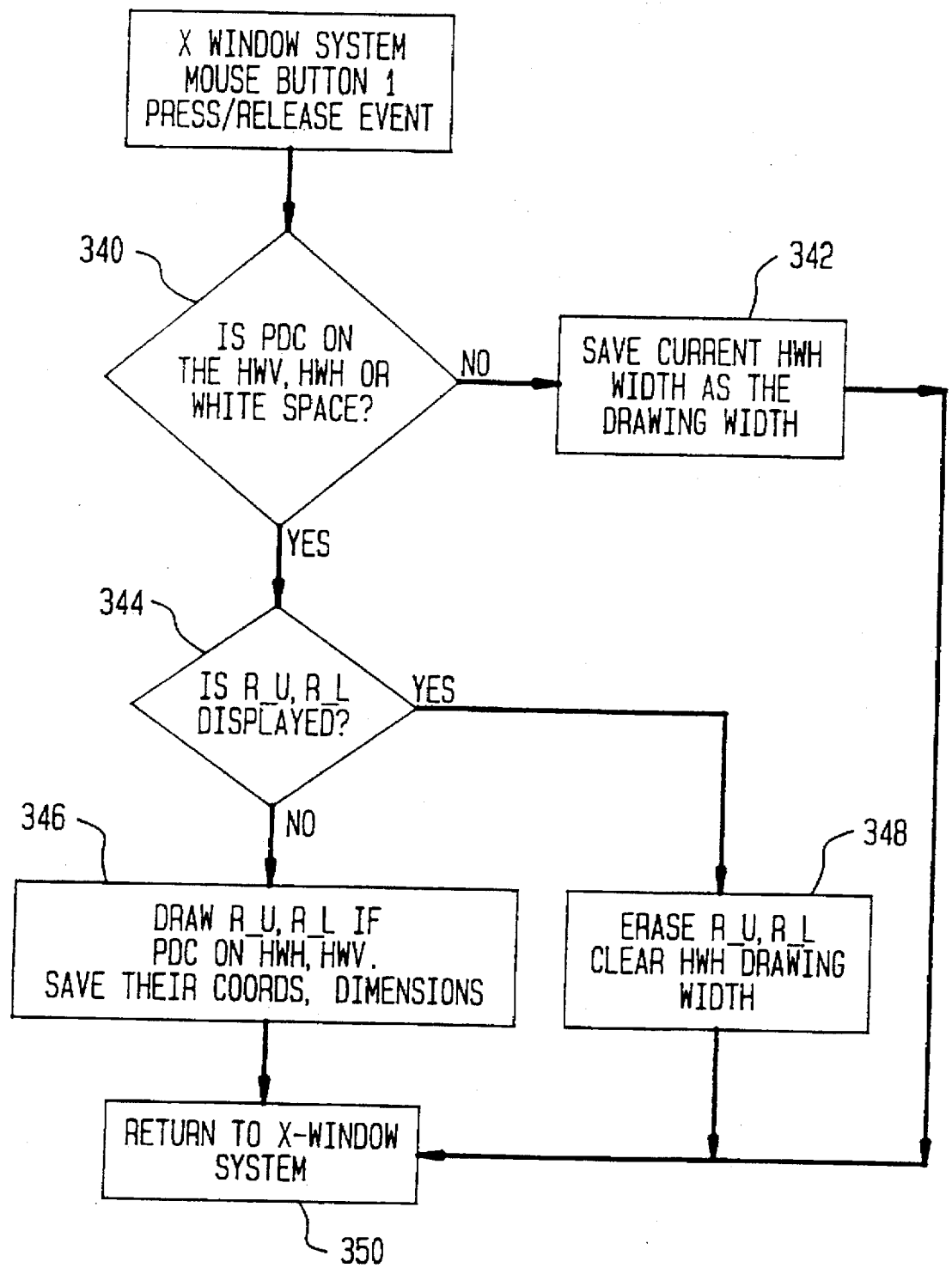
FIG. 18 illustrates the processing flow for user-initiated action for a press/release event terminating the motion of a portion of the exemplary second interactive icon utilized in the user interface of the present invention.

Reference is now made to FIG. 18 to describe the processing of X Window System Mouse Button 1 Press/Release Event which occurs when a user "clicks" mouse button 1. Upon entering the flow, a test is performed to determine if the pointing device cursor is over the high water vertical bar 232 and the high water horizontal bar 234 or white space on the screen 56 in step 340. If the pointing device cursor is not over the high water vertical bar 232 and the high water horizontal bar 234, control is passed to step 342 where the current high water horizontal bar 234 width is saved as the drawing width and then control is then passed back to the X Window system in step 350. If the pointing device cursor is over the high water vertical bar 232 and the high water horizontal bar 234, control is passed to step 344 where another test is performed to determine if the upper and lower handles are displayed. If they are, control is passed to step 348 to erase the upper and lower handles 244 and 246 and also to clear the horizontal bar 234 drawing width which means bringing it back to its initialized state. Control is then passed back to the X Window system in step 350. If the upper and lower handles are not displayed, control passes to step 346 where the upper and lower handles are drawn if the pointing device cursor is over the high water vertical bar 232 and the high water horizontal bar 234 and their coordinates are saved. Control is then passed to the X Window system in step 350.

Reference is now made to FIG. 19 to describe the processing of X Window System Mouse Button 1 Release Event which occurs when a user releases mouse button 1 after the user has been dragging the pointing device cursor. Upon entering the flow, the HWV_Selected flag is cleared if it was set in step 360. Next, the R_U flag is also cleared if it was set in step 362. The R_L flag is also cleared if it was set in step 364. Control is then passed back to the X Window system in step 366.

Once a value or a range of values is set indicating that an alarm is to be set off or some action is to take place, the values are stored within the X Window System. Stored along with these values are addresses to routines that would be invoked to perform the tasks required to sound an alarm or perform action such as taking a network disk offline when excessive errors are occurring when reading or writing to the network disk.

It should be understood that the foregoing description of the present invention is meant to be illustrative only. Thus, although only a few examples of the present invention have been described in detail, it is clear that the features of the present invention may be adapted to many different situations without departing from the spirit of the invention.

What is claimed is:

1. A system monitoring device for monitoring a performance of a system, the system monitoring device comprising:

display means for providing a graphical user interface to a user, said display means having a memory associated therewith;

means for storing in the memory information representative of the performance of the system being monitored;

means for displaying the stored information on said display means as a graph having a plurality of units of information; and means for selecting and viewing at least one of the plurality of units of information on said display means in response to a command entered by the user using the graphical user interface, the graphical user interface including a graphical representation including a first axis and second axis, a first interactive icon positioned on the first axis, the first interactive icon movable along the first axis by a pointer control device, the icon's position on the first axis determining a subset of the plurality of units of information for display on the graphical user interface, and an indicator bar positioned in relation to the plurality of units of information on the second axis, the indicator bar movable along the second axis by the pointer control device, the indicator bar's position on the second axis determining a data value for monitoring.

2. The system monitoring device according to claim 1 wherein the system being monitored is a computer network.

3. The system monitoring device of claim 1, further comprising means for providing an indication when a predefined relationship exists between the data value determined by the position of the indicator bar and the displayed information.

4. A system monitoring device comprising:

display means for providing an interface to a user to interact with information displayed therewith, said display means having memory means associated therewith;

means for storing preselected information representative of a system being monitored;

means for selecting a portion of the preselected information from the information stored in said memory means to be displayed on said display means;

a first interactive icon comprising a metaphor of a film editor for film, the film comprising a plurality of frames, wherein at least one of a number of one or more units of the selected portion of the preselected information is placed under at least one of the plurality of frames of the film;

means for manipulating the first interactive icon to thereby manipulate the selected portion of the preselected information;

means for setting and viewing a range of values in relation to other displayed information on said display device via direct manipulation in an intuitive manner, wherein the interface to the user further comprises a second interactive icon which includes a representation of the selected portion of the preselected information displayed on said display means; and means for manipulating the second interactive icon to set a range of values in relation to the other displayed information on said display means.

5. A system monitoring device for monitoring a computer network comprising:

display means for providing an interface to a user to interact with information displayed therewith, said display means having memory means associated therewith;

means for storing preselected information representative of a system being monitored;

means for selecting a portion of the preselected information from the information stored in said memory means to be displayed on said display means;

a first interactive icon comprising a metaphor of a film editor for film, the film comprises a plurality of frames, wherein at least one of a number of one or more units of the selected portion of the preselected information is placed under at least one of the plurality of frames of the film;

means for manipulating the first interactive icon to thereby manipulate the selected portion of the preselected information; and means for setting and viewing a range of values in relation to other displayed information on said display device via direct manipulation in an intuitive manner.

6. The system monitoring device according to claim 5 wherein the interface to the user further comprises a second interactive icon which includes a representation of the selected portion of the preselected information displayed on said display means.

7. The system monitoring device according to claim 6 further comprising means for manipulating the second interactive icon to set a range of values in relation to the other displayed information on said display means.

8. A method for monitoring activities of a system by a system monitoring device which includes a display device and having a memory associated therewith, comprising the steps of:

(a) selecting which activities of the system are to be monitored;

(b) storing information representative of the activities of the system being monitored in the memory;

(c) selecting a portion of the information stored in the memory to be displayed on the display device;

(d) controlling the displaying of the portion of the information being displayed on the display device to view the selected portion of the preselected information on the display device; and (e) manipulating a user interface provided by the display device to thereby manipulate the selected portion of the information displayed on the display device, the user interface comprising a first interactive icon, the first interactive icon comprising a metaphor of the selected portion of the information being printed on film, the film comprising a plurality of frames, wherein at least one of a number of one or more units of the selected portion of the information is placed under at least one of the plurality of frames of the film, wherein the user interface also comprises a second interactive icon that includes a representation of the selected portion of the information displayed on the display device, the method further comprising the step of manipulating the second interactive icon to set a range of values in relation to other displayed information on the display device.

9. The method for monitoring activities of a system according to claim 8, further comprising the step of moving a portion of the first interactive icon across the film to examine the selected portion of the information displayed under the plurality of frames.

10. The method for monitoring activities of a system according to claim 9 further comprising the step of altering the number of units of the selected portion of the information displayed under the plurality of frames.

11. A method for monitoring a computer network by a system monitoring device including a display device and having a memory associated therewith, comprising the steps of:
    (a) selecting which activities of the computer network are to be monitored;
    (b) storing information representative of the activities of the computer network in memory;
    (c) selecting a portion of the information stored in the memory to be displayed on the display device;
    (d) controlling the displaying of the portion of the information being displayed on the display device to display any portion of the information stored in the memory associated with the display device; and
    (e) manipulating a user interface provided by the display devices to thereby manipulate the selected portion of the information displayed on the display device, the user interface comprising a first interactive icon, the first interactive icon comprising a metaphor of the selected portion of the information being printed on film, the film comprising a plurality of frames, wherein at least one of a of a number of one or more units of the selected portion of the information is placed under at least one of the plurality of frames of the film, wherein the user interface also comprises a second interactive icon that includes a representation of the selected portion of the information displayed on a display device, the method further comprising the step of manipulating the second interactive icon to set a range of values in relation to other currently displayed information on said display device.

12. A system monitoring device comprising:
    display means for providing an interface to a user to interact with information displayed therewith, said display means having memory means associated therewith;
    means for storing preselected information representative of a system being monitored;
    means for selecting a portion of the preselected information from the information stored in said memory means to be displayed on said display means;
    means for viewing the selected portion of the preselected information on said display means;
    a first interactive icon comprising a metaphor of a film editor for film, the film comprising a plurality of frames, wherein at least one of a number of one or more units of the selected portion of the preselected information is placed under at least one of the plurality of frames of the movie film;
    means for manipulating the first interactive icon to thereby manipulate the selected portion of the preselected information, wherein the interface to the user further comprises a second interactive icon which includes a representation of the selected portion of the preselected information displayed on said display means; and
    means for manipulating the second interactive icon to set a range of values in relation to the other displayed information on said display means.

13. The system monitoring device according to claim 12 further comprising means for moving a portion of the first interactive icon across the film to scan the preselected information stored in said memory means on said display means.

14. The system monitoring device according to claim 13 further comprising means for altering the number of units of the selected portion of the preselected information displayed under at least one of the plurality of frames of the film.

15. The system monitoring device according to claim 12 wherein the system being monitored is a computer network.

16. An interactive icon for viewing data items on a system monitoring device, the system monitoring device monitoring a system and having a display device, each data item representative of a variable in the system, the interactive icon comprising:
    a metaphor of a roll of film, the film being stretched between a representation of a supply spool and a representation of a take-up spool, the film being divided into a plurality of frames, each frame including at least one data item, at least one data item of at least one frame displayed on the display device; and
    a magnifying glass image positioned over the film, said magnifying glass image identifying the at least one frame displayed on the display device;
    wherein the magnifying glass image is movable along the film to select frames displayed on the display devise.

17. An interactive icon which allows a user to set and view a range of values in relation to graphically displayed data on a display device in a system monitoring device, the interactive icon comprising:
    a directly manipulatable slider along a first axis of the graphically displayed data; and
    an indicator bar along a second axis of the graphically displayed data.

18. The interactive icon of claim 17 further comprising a first object positioned above said indicator bar and located on the second axis, the first object movable along the second axis, the location of the first object on the second axis determining a maximum value of the range of values of data.

19. The interactive icon of claim 18 further comprising a second object positioned below said indicator bar and located on the second axis, the second object movable along the second axis, the location of the second object on the second axis determining a minimum value of the range of values of data.

20. The interactive icon of claim 17, wherein the graphically displayed data is updated and displayed in real time.

21. A system monitoring interface to monitor a historical performance of a computer system, the system monitoring interface comprising:
    an input device to receive data items representative of the performance of the computer system;
    a memory coupled to the input device to store the data items in a historical log; and
    a display device coupled to the memory, the display device including a graphical user interface to display the data items stored in the historical log, the data items being displayed in the form of a frame including a plurality of units of information, each one of the plurality of units of information representing one data item, the frame including a first axis and a second axis, the graphical user interface including:
        a first interactive icon positioned on the first axis of the frame, the first interactive icon movable along the first axis by a pointer control device, the position of the first interactive icon on the first axis determining a subset of the plurality of units of information for display on the graphical user interface, and
        an indicator bar positioned on the second axis of the frame, the indicator bar movable along the second axis by the pointer control device, the indicator bar's position on the second axis determining a data value for monitoring.

22. The system monitoring interface of claim 21 wherein the plurality of units of information are time ordered.

23. A system monitoring interface to monitor the performance of a computer system, the system monitoring interface comprising:

an input device to receive data items representative of the performance of the computer system;

a memory coupled to the input device to store the data items; and a display device coupled to the memory, the display device including a graphical user interface to display the stored data items, the data items being displayed in the form of a frame including a plurality of units of information, each one of the plurality of units of information representing one data item, the frame including a first axis and a second axis, the graphical user interface including a first interactive icon positioned on the first axis of the frame, the first interactive icon movable along the first axis by a pointer control device, the position of the first interactive icon on the first axis determining a subset of the plurality of units of information for display on the graphical user interface, and an indicator bar positioned on the second axis of the frame, the indicator bar movable along the second axis by the pointer control device, the position of the indicator bar on the second axis determining a data value for monitoring.

24. The system monitoring interface of claim 23 wherein the data items are received by the input device in real time.

25. The system monitoring interface of claim 24 wherein the data items are displayed on the graphical user interface in real time.

26. The system monitoring device of claim 23, further comprising an indication device to provide an indication when a predefined relationship exists between the data value determined by the position of the indicator bar and the displayed information.

* * * * *